(12) United States Patent
Unton

(10) Patent No.: US 11,473,506 B2
(45) Date of Patent: Oct. 18, 2022

(54) ELECTROMAGNETIC CARBON SEAL SYSTEM

(71) Applicant: Rolls-Royce North American Technologies Inc., Indianapolis, IN (US)

(72) Inventor: Timothy Unton, Avon, IN (US)

(73) Assignee: ROLLS-ROYCE NORTH AMERICAN TECHNOLOGIES INC., Indianapolis, IN (US)

(*) Notice: Subject to any disclaimer, the term of this patent is extended or adjusted under 35 U.S.C. 154(b) by 0 days.

(21) Appl. No.: 16/952,045

(22) Filed: Nov. 18, 2020

(65) Prior Publication Data

US 2022/0154649 A1 May 19, 2022

(51) Int. Cl.
*F02C 7/28* (2006.01)
*F01D 11/00* (2006.01)
*F16J 15/34* (2006.01)
*F01D 25/18* (2006.01)

(52) U.S. Cl.
CPC .............. *F02C 7/28* (2013.01); *F01D 11/003* (2013.01); *F16J 15/3444* (2013.01); *F16J 15/3488* (2013.01); *F01D 25/183* (2013.01); *F05D 2300/224* (2013.01)

(58) Field of Classification Search
CPC ...... F16J 15/00; F16J 15/3436; F16J 15/3444; F16J 15/3488; F02C 7/00; F02C 7/28; F01D 11/00; F01D 11/003; F01D 25/00; F01D 25/183; F01D 25/186; F05D 2300/00; F05D 2300/224
USPC ........................................................ 277/358
See application file for complete search history.

(56) References Cited

U.S. PATENT DOCUMENTS

| 2,843,403 | A | | 7/1958 | Stevenson |
| 3,708,177 | A | * | 1/1973 | Baermann ............ F16J 15/3444 277/378 |
| 4,795,168 | A | | 1/1989 | Adams et al. |
| 5,417,478 | A | * | 5/1995 | Dyer ...................... B60T 13/58 303/15 |

(Continued)

FOREIGN PATENT DOCUMENTS

CN 105644924 A 6/2016

OTHER PUBLICATIONS

Metallized Carbon Corporation, "Mechanical Carbon Materials for Aircraft Seal Applications," dated Sep. 1, 2015, pp. 1-4, Tech Briefs Media Group, Ossining, New York, available at https://www.techbriefs.com/component/content/article/tb/pub/techbriefs/materials/22850.

(Continued)

*Primary Examiner* — Nathan Cumar
(74) *Attorney, Agent, or Firm* — Crowell & Moring LLP

(57) ABSTRACT

A seal system may include a static housing, a carbon seal positioned in the static housing, a runner having a sealing surface aligned with the carbon seal, a number of electromagnets positioned in the static housing, and a controller circuitry. The controller circuitry may control a variable flow of electric current to control an electromagnetic field respectively generated by each of the electromagnets. The controller circuitry may variably apply the electromagnetic field to move at least one of the carbon seal or the runner and correspondingly adjust an applied force loading of an interface of the carbon seal and the sealing surface of the runner.

20 Claims, 10 Drawing Sheets

(56) References Cited

U.S. PATENT DOCUMENTS

| | | | |
|---|---|---|---|
| 8,558,425 B2* | 10/2013 | Stahlhut | H02K 1/20 |
| | | | 310/156.37 |
| 9,791,047 B2 | 10/2017 | De La Bruere Terreault | |
| 2003/0042684 A1* | 3/2003 | Dawson | F16J 15/3444 |
| | | | 277/412 |
| 2014/0286599 A1* | 9/2014 | Devitt | F16C 32/067 |
| | | | 384/101 |
| 2017/0211704 A1* | 7/2017 | De La Bruere Terreault | |
| | | | F16J 15/3444 |
| 2018/0017166 A1* | 1/2018 | Ryan | F16J 15/348 |

OTHER PUBLICATIONS

Sanderson, Roger, "Smarter seal solutions achieving reduced machinery maintenance requirements," dated May 10, 2016, pp. 1-9, Magnetic Seal Corporation, Warren, RI.

"Carbon Ring Seal," at least as early as 2019, pp. 1-44, from Compression Machinery for Oil and Gas, Science Direct, downloaded Sep. 24, 2020 available at https://www.sciencedirect.com/topics/enqineering/carbon-ring-seal.

"Special Situations Require Special Seals," dated Nov. 16, 2016, pp. 1-3, Magnetic Seal Corporation, Warren, RI available at www.magseal.com.

\* cited by examiner

ELECTROMAGNETIC CARBON SEAL SYSTEM

TECHNICAL FIELD

This disclosure relates to carbon seals and, more particularly, to an electromagnetic carbon seal system.

BACKGROUND

Lubrication systems, such as oil systems in rotating mechanical systems such as gas turbine engines and gearboxes lubricate various parts, such as bearings, and may also provide a temperature regulating function. Seals are used between rotating and non-rotating parts of such systems to maintain the oil in desired areas. Such seals may wear and/or leak over time due to contact with the rotation parts, thereby causing downtime for maintenance activities to replace or repair the seals.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A seal system may include a runner and a carbon seal aligned with the runner at a sealing surface of the runner. One of the carbon seal or the runner may be coupled with a rotating member within a rotating mechanical system. The seal system may also include a static housing supporting the carbon seal or the runner to maintain alignment of the carbon seal with the sealing surface of the runner. The carbon seal may be moveable with respect to the runner and the static housing. The seal system may also include a plurality of electromagnets. Each of the electromagnets may have a respective variable magnetic field generated based on a variable current supplied to the respective electromagnets. The seal system may also include a controller circuitry configured to dynamically and selectively control the respective variable magnetic field of the electromagnets to adjust a sealing force loading of an interface of the carbon seal and the sealing surface of the runner.

The seal system may have a carbon seal placed in alignment with a sealing surface of a runner, where one of the carbon seal or the runner are coupled to a rotating member and the other of the carbon seal or the runner are held in a static housing. During operation, the controller circuitry may energize the electromagnets with a power supply to create respective magnetic fields for each of the electromagnets, by dynamically adjusting the power supply to dynamically adjust a magnetic energy of the respective magnetic fields. Using the variable magnetic fields of the electromagnets, the controller circuitry may control movement of at least one of the carbon seal or the runner in order to correspondingly adjust an applied force loading of an interface of the carbon seal and the sealing surface of the runner.

An interesting feature of the systems and methods described below may be that electromagnets may be used in conjunction with mechanical springs providing a static preload as a sealing force loading of the interface of the carbon seal and the sealing surface of a runner. Energization of the electromagnets may be used to dynamically adjust the static pre-load as operating conditions change.

Alternatively, or in addition, an interesting feature may relate to use of permanent magnets with the electromagnets in the seal system and controlling a polarity of the electric current supplied to the electromagnets to reverse the direction of the applied force to allow addition or subtraction of applied loading by the electromagnets according to the polarity of the electric current.

Alternatively, or in addition, an interesting feature may relate to controlling a respective plunger of each of the electromagnets to provide a variable applied force used to adjust sealing force loading of the interface of the carbon seal and the sealing surface of the runner.

Figure 1:
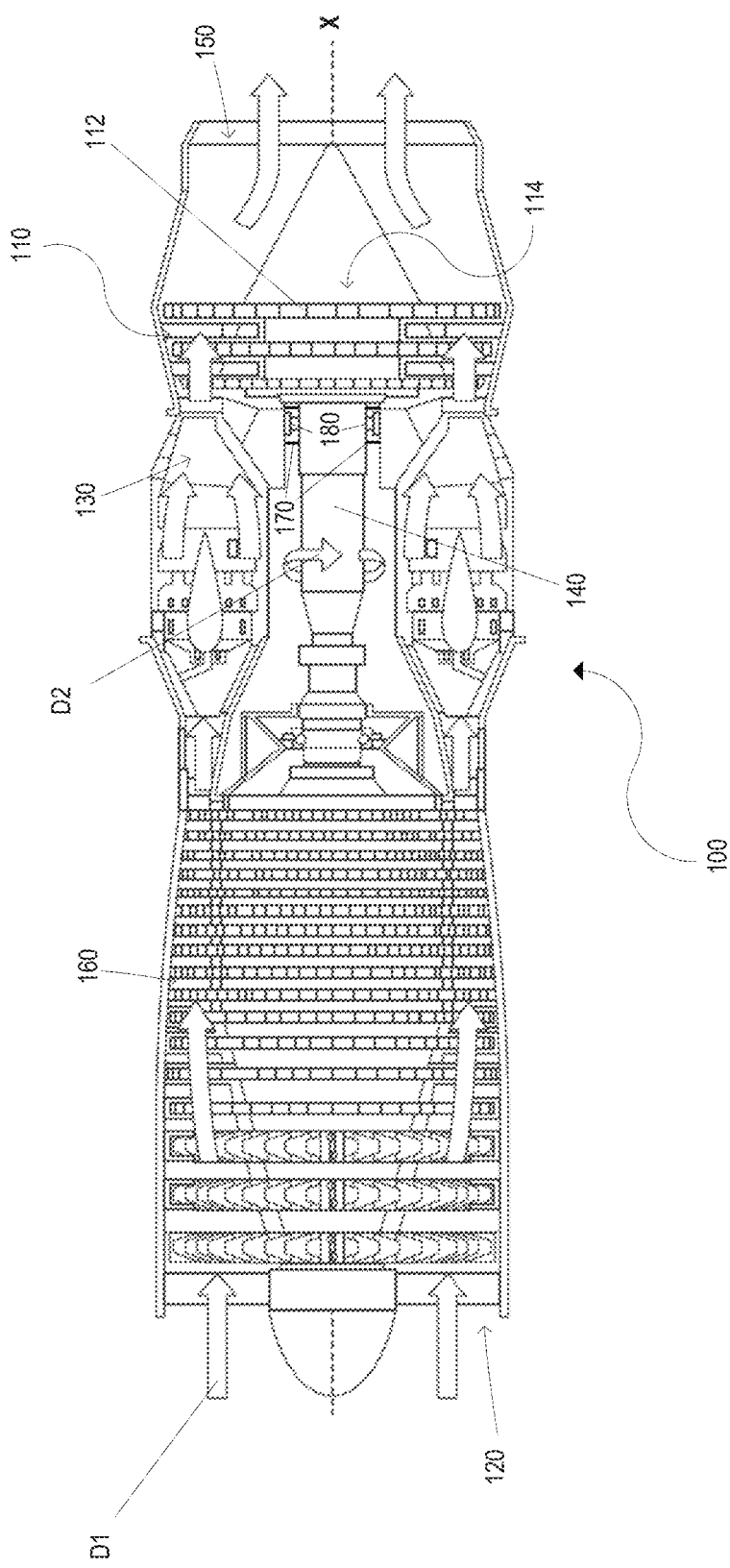
FIG. 1 is a cross-sectional view of a gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid resulting from combustion, may then pass through the turbine section 110 to extract energy from the hot, high pressure fluid and cause a turbine shaft of a turbine 114 in the turbine section 110 to rotate, which in turn drives the compressor section 160. Discharge fluid, such as exhaust gases, may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

The gas turbine engine 100 may be cooled and lubricated by one or more fluids such as air and oil. Such fluids may be contained or confined in different parts of the gas turbine engine 100 by seals. In some examples, the seals may provide a seal between a rotating part of the gas turbine engine 100 and a stationary part of the gas turbine engine 100. For example, a seal 170, such as a stationary seal, may be provided to surround the rotating shaft 140 to retain a fluid, such as oil, around a shaft bearing 180. In other examples, seals performing other containment/retention functions may be used, other seals such as rotating seals may be used, and/or seals in other locations may be illustrated.

An example of a seal is a carbon seal, which may be an effective means of providing sealing around, for example, sumps, bearings and air systems in gas turbine engines. Carbon seals may use springs, such as wave springs, garter springs or linear springs to provide a force pushing two faces of the carbon seal together to form the seal. One challenge with spring-driven carbon seals is that the load exerted on the face(s) of the seal varies with the displacement of the seal itself by the form of $F=kx$ where F is the force, k is the spring constant and x is the displacement of the seal. As the seal wears or system pressures and loads exert forces on the seal opposing the spring, a variable load is seen at the interface, which may lead to either premature wear and excessive seal temperatures due to friction if the spring force on the seal is too high relative to the load, and/or may result in a loss of sealing if the spring force on the seal is too low relative to the load. An alternative means of providing this clamping force may use permanent magnets instead of a spring, which may provide a more constant load force with varying displacements.

Both spring loaded seals and permanent magnet loaded seals provide a constant loading on the carbon seal. In situations where the carbon seal may experience widely varying loads on either side of the seal during expected operating conditions, the loading provided by springs or permanent magnets may be too much in some scenarios resulting in premature wear or leakage, or not enough in other scenarios resulting in leakage. For example, in a gas turbine engine where there may be a significant change in atmospheric pressure from sea level to an altitude of 35,000 feet, which may be on one side of the seal or when an oil system is intermittently turned on and off and thus the seal experiences both pressurized and unpressurized situations, or during startup-type conditions where pressure on the seal can vary.

In another example, where the seal is a carbon seal, the seal may be dynamically actuated using an electromagnet. By controlling the amount of current supplied to the electromagnet, the corresponding seal pressure loading force exerted on the seal may be varied. By controlling the seal pressure loading force, the load on the seal may be optimized throughout all operating conditions in which the seal provides its sealing function. Optimization of seal load may ensure that a load across the seal is maintained so that the seal does not leak. In addition, the load applied to the seal may be consistently and desirably maintained in a predetermined range, despite operating conditions, resulting in relatively consistent and controlled frictional heat generation at the seal. Since frictional heat generation at the seal is correspondingly controlled, dissipation of generated heat may be aligned with the expected predetermined range to optimize use of cooling resources. Maintaining the temperature of the seal in a predetermined range may also lead to longer seal life.

Figure 2:
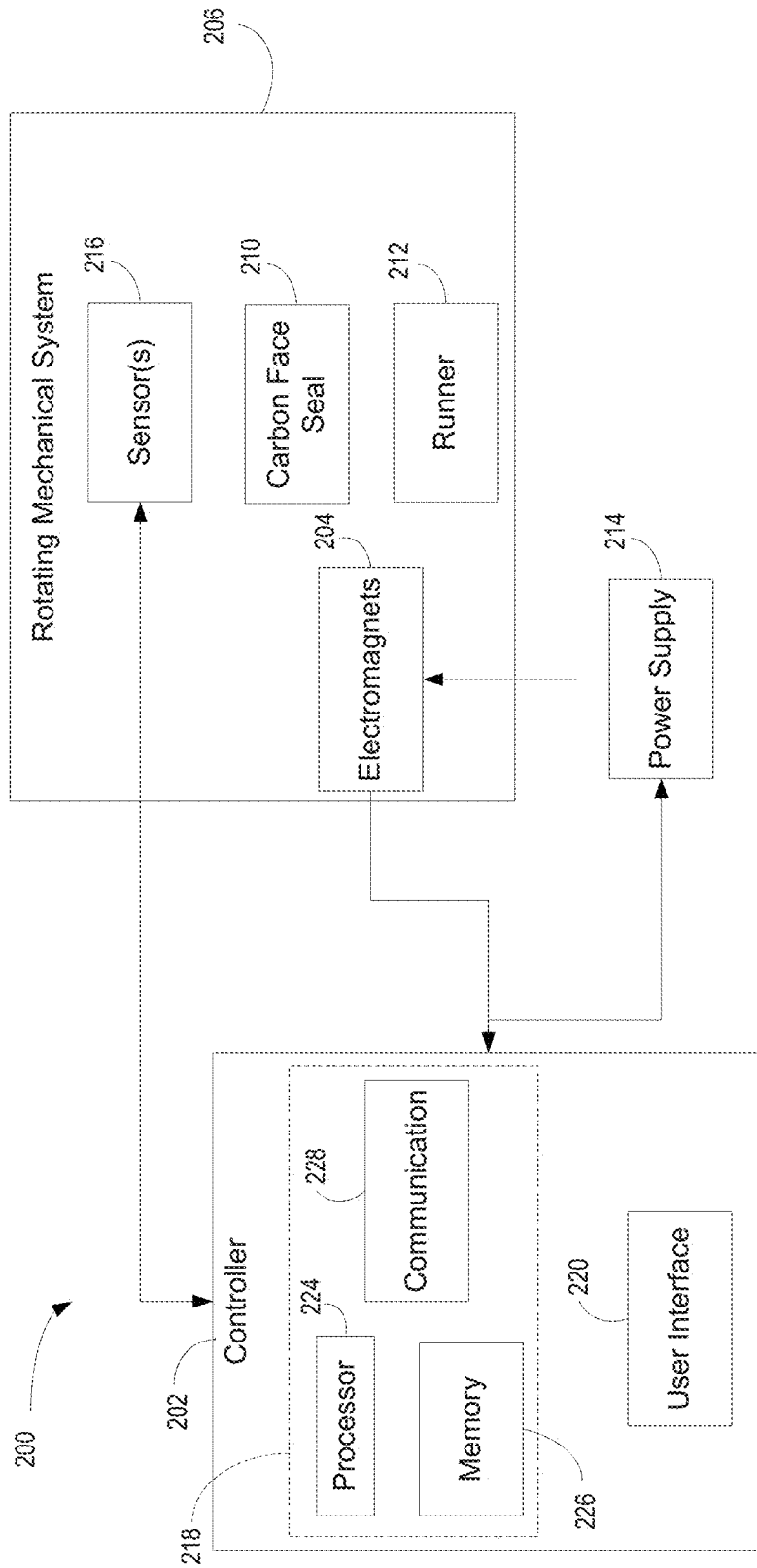
FIG. 2 is a block diagram of an example electromagnetic carbon seal system.

FIG. 2 is a block diagram of an example electromagnetic carbon seal system 200. The system 200 may include controller circuitry 202 controlling electromagnets 204 positioned in a rotating mechanical system 206, such as a gas turbine engine or a gear box to adjust sealing force loading of a carbon seal 210. The carbon seal 210 may be a face seal or a circumferential seal that is aligned with a sealing surface of a runner 212, and may be in contiguous contact with the runner 212 or separated away from the sealing surface by a predetermine air gap. One of the carbon seal 210 or the runner 212 may be coupled with a rotating member in the rotating mechanical system 206, and the other of the carbon seal 210 or the runner 212 may be statically mounted in the rotating mechanical system 206. In other examples, the carbon seal 210 or the runner 212 may both be static or may both be rotating.

The controller circuitry 202 may control a respective variable magnetic field generated by each of the electromagnets 204 by controlling a variable current output of one or more power supplies 214 to one or more of the respective electromagnets 204. Each of the electromagnets 204 include an electromagnetic coil that generates a respective variable magnetic field according to the variable current controlled by the controller circuitry 202. In some examples, the controller circuitry 202 may also control the polarity of the electric current and voltage output by the power supply 214.

The power supply 214 may be a voltage and/or current controlled power source in communication with the controller circuitry 202. The power supply 214 may also, in some examples, include a reversible polarity output such that the polarity of the current and voltage output by the power supply 214 may be toggled, or reversed, by the controller circuitry 102. Thus, in these examples, the controller circuitry 102 may control swapping or interchangeability of the locations of the magnetic poles (North, South) of the electromagnets 204 by toggling the output polarity of the current/voltage output by the power supply 214. The power supply 214 may be a power supply dedicated to supplying the electromagnets 204, or may be power circuitry supplied power from an existing power supply of the rotating mechanical system 206 that is controlled by the controller circuitry 202 via power circuitry.

The electromagnets 204 may be any form of electrically operated magnet capable of outputting a variable strength magnetic field in response to a corresponding variable supply of voltage and/or current. For example, the electromagnet 204 may be formed by a conductive wire wrapped around a core of ferromagnetic material such as iron or steel. Alternatively, in another example the electromagnets 204 may be a coil of conductive wire with an air core. In these example implementations, when subject to a flow of current, the atoms in the ferromagnetic material are aligned creating poles having magnetic attraction or repulsion forces. A magnetic field created with an electric current will converge or diverge at the poles. Accordingly, magnetic field lines are closest together at the poles of the electromagnets and create the strongest magnetic energy in the immediate vicinity of the poles. The magnetic fields generated at the poles may attract ferromagnetic materials, such as steel. In addition, the poles may be attractive to opposite poles of other magnets, and repulsive to like poles of other magnets.

The controller circuitry 102 may dynamically and selectively control the respective variable magnetic field of the electromagnets 204 to adjust sealing force loading, or applied force loading of an interface of the carbon seal 210 and the runner 212. At the interface, the carbon seal 210 and the runner 212 may, for example, be in contiguous contact. Alternatively, in other examples, there may be a gap between the carbon seal 210 and the runner 212 at the interface. In examples where a gap is present, a dimension of the gap created by the spaced away position of the carbon seal 210 with respect to the runner 212 at the interface may be governed by the balance of forces acting upon the carbon seal 210. The balance of forces may include fluid pressure on either or both sides of the carbon seal 210, force applied through the carbon seal 210, force applied through the runner 212, or some combination of these forces. Increasing the applied force at the interface may change the balance of forces to either increase or decrease the dimension of the gap as desired.

Different methods of control of the applied force load of the carbon faced seal are contemplated, including an open loop style control, a closed loop style control and/or a combination, which may use one or more inputs from sensors 216. For example, the controller circuitry 202 may use an open-loop style control scheme where the electric current (and hence preload) supplied by the power supply 214 to the electromagnets 204 may be varied based on operating characteristics sensed by one or more sensors 216.

The sensors 216 may be existing sensors included in the rotating mechanical system 206, or sensors specifically deployed for use in controlling the electromagnets 204. The sensors 216 may be, for example, angular displacement sensors, revolution per minute sensors, pressure sensors, temperature sensors, displacement sensors, force sensors, strain gauge sensors, proximity sensors, linear variable different transformer (LVDT) sensors, and the like, sensing respective operational parameters such as shaft speed and/or sump pressures/temperature and/or ambient pressures/temperatures of the rotating mechanical system 206.

In addition, or alternatively, the controller circuitry 202 may employ an open loop control scheme using, for example analytical predictions of desirable seal pressure loads during expected operation of the rotating mechanical system 206. Alternatively, or in addition, empirically gathered test data from operation of the rotating mechanical system 206 may be used as set points in an open loop control scheme. Such data may be stored in, for example, a lookup table or database for use by the controller circuitry 202 to adjust the electric current of the electromagnets 204 accordingly.

Open loop control of the electromagnet(s) 210 by the controller circuitry 202 may be based on, for example, digital physics-based engine models/simulations, which may be combined with the existing instrumentation available on the rotating mechanical system 206, such as a gas turbine engine. Existing available instrumentation may provide operational parameters such as, for example, shaft speeds, various temperature and pressure sensors, accelerometers, and the like. The combination of the digital physics-based engine models/simulations and the operational parameters may be used to establish a desired position/applied force loading of the interface of the carbon seal 210 and the runner 212 and a corresponding magnitude of current to supply to the electromagnets 204 based on the operating condition. Alternatively or in addition, correlations between available instrumentation and carbon seal performance that are created during development testing of the carbon seal may be used. Alternatively or in addition, machine learning may be used to develop models between the operating parameters of the rotating mechanical system 206 and a magnitude of current supplied to the electromagnets 204 that results in desirable applied force loading of the interface of the carbon seal 210 and the runner 212 under similar operating conditions. Artificial intelligence learned based on the performance of a fleet of similar rotating mechanical systems, such as a fleet of similar gas turbine engines, may augment the models that are used on a single rotating mechanical system 206. Alternatively or in addition, empirically or simulation-based wear models may be used to adjust the current supplied to the electromagnets, and corresponding applied force loading, based on the number of running hours, the speed at which the rotating mechanical system 206 has been run and/or the operating characteristics. Alternatively or in addition, pre-programmed current/force setpoints may be used based on current operating conditions of the rotating mechanical system 206.

In other examples, the controller circuitry 202 may use a closed loop control scheme with feedback. For example, the controller circuitry 202 may use one or more sensors 216, such as proximity sensors embedded within, or proximate to, the carbon seal 210 to dynamically adjust the current supplied by the power supply 214 in order to maintain the relative displacement of the carbon seal 210 constant. The relative placement may be, for example, between two carbon seals, or between the carbon seal and some other object or reference point in the rotating mechanical system 206. Another example closed loop control style may by the use of temperature feedback from the sensor 216 to adjust the load (higher loads will produce higher temps while lighter loads will reduce relatively lower temperature). An optional method may be to start a test program with one of the closed-loop control methods mentioned previously, gather data on the required loads/current vs other operating characteristics/parameters and then switch to an open-loop style control for saving space/weight in a future iteration. The example electromagnetic carbon seal system 200 may also enable increasing the shaft speed for which this type of seal can be used due to the decrease in operating temperatures.

Examples of the types of instrumentation and control schemes that may be used by the controller circuitry 202 for closed-loop control of the electromagnets include: temperature sensors, such as, for example, thermocouple, RTD, infrared, and the like may be installed on/in the static housing 302, and/or temperature sensors on the rotating side, such as a thermocouple, RTD, infrared and the like. Another example closed loop control may use a proximity probe positioned to view the rotating shaft 140 in order to dynamically adjust preload as the shaft 140 rotates, and/or grows due to centrifugal force (cf) load and/or temperatures. In another example closed loop control, a force sensor, such as a strain gauge or similar device, may be positioned between the carbon seal 210 and a carriage (described elsewhere) or between a plunger (described later) and the carbon seal 210. In yet another example closed loop control, pressure sensors may measure pressure on one side of the carbon seal 210, or both sides of the carbon seal 210, or a delta pressure across the carbon seal 210. In still another example closed loop control, a linear variable differential transformer (LVDT) sensor may be either integrated with the electromagnets 204, or may be at a separate location sensing relative position of the carbon seal 210 with respect to the runner 212. In another example closed loop control, a capacitive displacement sensor may be positioned to view the rotating shaft 140 in order to dynamically adjust the variable magnetic energy output by the electromagnets 204 similar to the proximity probe control or may be like the LVDT control. In yet another example closed loop control, a photocell/LED emitter may be used in situations where there is a predetermined running gap desired between the carbon seal 210 and the runner 212 the size of the actual running gap may be correlated to projection of light from one side of the gap to the other side of the running gap.

The controller circuitry 202 may include system logic 218 and user interface circuitry 220. The system logic 218 may include any combination of hardware, software, firmware, or other circuitry. The system logic 218 may be implemented, for example, with one or more systems on a chip (SoC), application specific integrated circuits (ASIC), discrete analog and digital circuits, and other circuitry. The system logic 218 is part of the implementation of any desired functionality in the electromagnetic carbon seal system 200.

The system logic 218 may include one or more processors 224 executing instructions stored in memory 226. The circuitry of the controller 202 may include executable logic stored in memory 226 to provide at least a portion of the functionality described herein. The processor 224 may include communication circuitry 228 to provide signal input/output capability for communication with the rotating mechanical system 206, the electromagnets 204, and the power supply 214. The processor 224 may also be in communication with the sensors 216 and other devices and systems associated with the rotating mechanical system 206.

In the example of a gas turbine engine, the controller circuitry 202 may receive parameters, such as operational values related to operation of the gas turbine engine via the communication circuitry 228. In addition, the controller circuitry 202 may output parameters and control commands via the communication circuitry 228 to the rotating mechanical system 206, the electromagnets 204, and the power supply 214, and also devices and systems associated with the rotating mechanical system 206. Communication via the communication circuitry 228 may be wired or wireless, and may be in the form of individual signals, groups of signals, network communication protocols, proprietary protocols and/or other forms of electronic based messaging or signal transmission. In an example of a gas turbine engine, or a gearbox, the controller circuitry 202 may be one or more controllers, such as electronic control units (ECU), and/or full authority digital engine control (FADEC) units.

Also, multiple controller circuitry 202 may be used for redundancy in rotating mechanical systems 206 such as gas turbine engines and gear boxes. For example, the controller circuitry 202 may include a first controller circuitry and a second controller circuitry that are different and independently executed. The first controller circuitry may dynamically and selectively adjust a magnetic field of a first portion of the electromagnets, and the second controller circuitry may dynamically and selectively adjust a magnetic field of a second portion of the electromagnets. In such redundancy schemes, the first portion of the electromagnets may be interspersed or uniformly distributed throughout the second portion of the electromagnets such that the resulting magnetic fields from electromagnets are not just concentrated in certain physical areas in the event of a partial malfunction. Accordingly, even if one of the first or the second controller circuitry malfunctioned, a portion of the electromagnets would still be functional and available for use.

The user interface 220 may include a graphical user interface, touch sensitive display, voice or facial recognition inputs, buttons, switches, speakers and other user interface elements. Additional examples of the user interface 220 include microphones, video and still image cameras, temperature sensors, vibration sensors, rotation and orientation sensors, headset and microphone input/output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs.

The I/O interfaces 128 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

Figure 3:
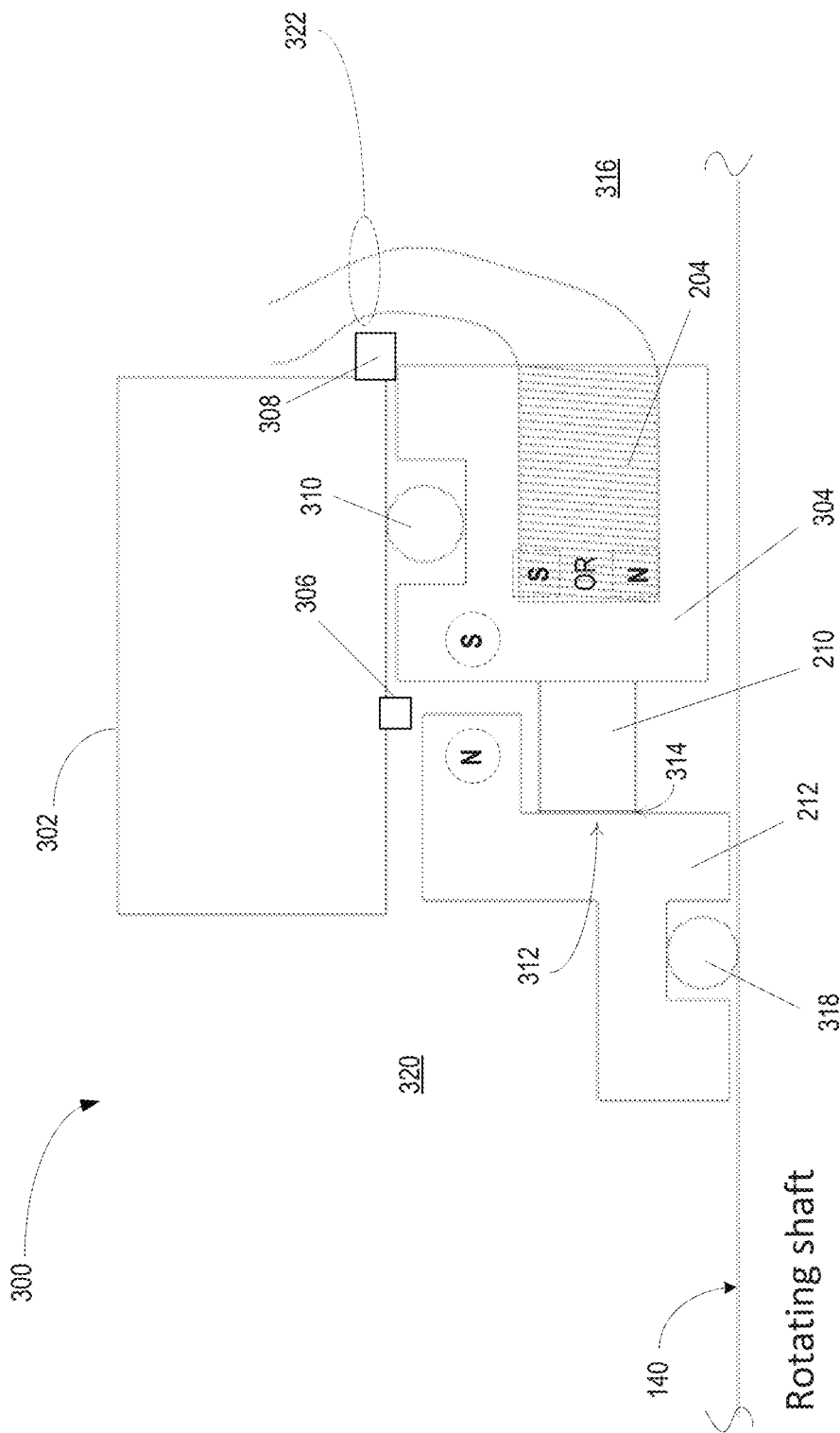
FIG. 3 is a cutaway view of an example electromagnetic carbon seal system and a portion of a rotating mechanical system.

FIG. 3 is a cutaway view of an example electromagnetic carbon seal system 300 and a portion of a rotating mechanical system that includes a shaft 140 and a static housing 302. The example electromagnetic carbon seal system 300 includes electromagnets positioned in or on a carriage 304. The carriage 304 may be a unitary monolithic rigid structure that circumferentially surrounds the shaft 140 at a predetermined radial distance such that the static housing 302 circumferentially surrounds the carriage 304 and statically maintains the radial position of the carriage 304 with respect to the shaft 140. In the illustrated example, the carriage 304 may be disposed between the shaft 140 and the static housing 302 so as to be capable of begin slid into position to rest against a shoulder 306 included in the static housing 302 and be in contiguous supporting contact with the static housing 302. The carriage 304 may be held in position opposite the shoulder by a slip ring 308 and sealed with the static housing 302 with a static housing o-ring 310. Accordingly, upon removal of the slip ring 308, the carriage 302 may be removed for maintenance and/or inspection.

The carriage 304 may be a rigid structure that includes a carbon seal 210 and electromagnets 204. The carbon seal 210 may be a carbon face seal in contiguous contact, or aligned with, a runner 212 having a sealing surface 312 included on the runner 212 at an interface 314. The carbon seal 210 may be aligned with the sealing surface 312 to be in contiguous contact, or to provide a gap between the carbon seal 210 and sealing surface of the runner 212. The gap may be a desired predetermined opening to minimize friction, and be appropriately pressurized, such as with air from an air side 314 of the rotating mechanical system 206 (FIG. 2), such that entry of oil from an oil sump 320 into the gap is discouraged. The runner 212 may rotate with the shaft 140. Other than being bridged at the sealing surface 312, the carriage 304 may be spaced away from the runner 212 so that the runner 212 is free to rotate with the shaft 140 without interference by the stationary carriage 304. The carriage 304 may be moveable with respect to the runner 212 and the static housing 302 so that the carbon seal 210 remains aligned with sealing surface 312 of the runner 212 to provide sealing force loading of the interface 314 with the sealing surface 312 of the runner 212.

The runner 212 may also move axially along the shaft 140 and be sealed against the rotating shaft 140 by a static shaft o-ring 318. The carbon seal 210, along with the static shaft o-ring 318 and the static housing o-ring 310 may operate as seals to keep lubricating and/or cooling oil in the sump 320. In other examples, the carbon seal 210 may be coupled to, and rotate with, the shaft 140 and the runner 212 may be stationary and coupled with the carriage 304 such that the carbon seal 210 still maintains the oil in the sump 320. In an example configuration, the carriage 304 may be annularly and axially aligned with a rotating member, such as the shaft 140, to which the runner 212 is coupled, and the electromagnets 204 may in a spaced apart arrangement in the carriage 304 to magnetically attract the carriage 304 to the runner 212 with the electromagnetic field respectively generated by each of the electromagnets 204.

In an example embodiment, the carriage 302 and the runner 212 may be a ferromagnetic material, such as steel. Each electromagnetic coil of a respective electromagnet 204 may be positioned to align the respective variable magnetic field of the electromagnets 204 with the runner 212 or the carriage 302 holding the carbon seal. Ferromagnetic material is reactive to the respective variable magnetic field of the electromagnets 204. In this example, the ferromagnetic material of the carriage 302 may be induced by the magnetic field created by energization of the electromagnets 204 to attract the runner 212 to the electromagnets 204 when the electromagnets 204 are energized and producing an electromagnetic field having variable magnetic energy according to the magnitude of electric current being supplied. In alternative examples, the carriage 302 may be a non-magnetic material that allows pass through to the runner 212 of the variable magnetic energy of the magnetic field being generated by the electromagnets 204. Thus, dependent on the amount of electric current being supplied to the electromagnets 204, the sealing force applied by the carbon seal 210 on the runner 212 may be varied due to the varied level of magnetic energy and corresponding attraction force of the runner 212.

In another example embodiment, the carriage 302 may include both a permanent magnet and the electromagnets 204. For example, all or part of the body of the carriage 302, other than the electromagnets 204, may be a permanent magnet, such as iron, nickel, cobalt or a rare earth metal. Thus, the carriage 302 may provide constant magnetic energy from the constant magnetic field generated by the permanent magnet, and variable magnetic energy from the electromagnets 204 being supplied a variable amount of electric current by the controller circuitry 202. Thus, the runner 212 may be constantly attracted by the permanent magnet resulting in a constant sealing force (static pre-load) being applied by the carbon seal 210 on the runner 212 and an additional sealing force being applied by the carbon seal 210 on the runner 212 due to variable magnetic energy supplied by the electromagnets 204. In an example, the poles of the permanent magnet are aligned with the poles of the electromagnets 204, such that the variable magnetic energy of the electromagnets 204 is additive to the constant magnetic energy of the permanent magnet.

In yet another example embodiment, the runner 212 includes, or consists of a runner permanent magnet, and the carriage 302 may include both a carriage permanent magnet and the electromagnets 204. For example, all or part of the body of the runner 212, and all or part of the body of the carriage 302, other than the electromagnets 204, may be a permanent magnet, such as iron, nickel, cobalt or a rare earth metal. When the poles of the runner permanent magnet are oppositely aligned with the poles of the carriage permanent magnet, the runner 212 and the carriage will be attracted to each other with constant respective magnetic fields, and the carbon seal 210 will apply a corresponding constant static pre-load sealing force to the runner 212. In FIG. 3, the runner 212 is illustrated as having a "N" in a dotted circle to represent the north pole of the runner permanent magnet, and the carriage 302 is illustrated as having an "S" in a dotted circle to represent a south pole of the carriage permanent magnet facing the north pole of the runner permanent magnet such that magnetic attraction occurs.

In this example, since there are two permanent magnets cooperatively operating, the force of the constant static pre-load sealing force, or applied pre-load seal loading, of the interface 314 of the carbon seal 210 and the runner 212 may be greater than in the previously discussed example, or, the magnetic energy of the carriage permanent magnet may be less than in the previously discussed example, without resulting in a lesser constant sealing force than in the previous example. The electromagnets 204 may have a north pole or a south pole, as represented by an "N" "or" an "5" in a rectangular dotted box in FIG. 3. Since the magnetic energy of the electromagnets 204 is generated by electric current provided via a pair of electric current supply lines 322, changing the polarity of the current supplied to the pair of electric current supply lines 322 changes the pole facing the carbon seal 210 between the north pole "N" and the south pole "5". In this way, the controller circuitry 202 may control the electromagnets 204 to provide additive magnetic energy, in this example by generating a south pole, or repulsive magnetic energy, in this example by generating a north pole facing the carbon seal 210 and the runner 212. Thus, the electromagnets 204 may provide an additive magnetic energy or a subtractive magnetic energy according to the electric current polarity controlled by the controller circuitry 202. The controller circuitry 202 may control the power supply 214 to provide a variable magnetic field to increase the constant sealing force, or constant applied seal loading, of the interface 314 of the carbon seal 210 and the runner 212, or the variable magnetic energy of the electromagnets 204 provided by the controller circuitry 202 may be subtractive or cancelling of the constant magnetic energy of the permanent magnets present in carriage 304 and the runner 212.

In still another example embodiment, the permanent magnet may be omitted from the carriage 304. In this example, the permanent magnet included in the runner 212 (runner permanent magnet) generates constant magnetic energy in a magnetic field that provides a constant sealing force, or constant applied seal loading of the interface 314 of the carbon seal 210 and the runner 212. The electromagnets 204 may provide an additive magnetic energy or a subtractive magnetic energy according to the polarity controlled by the controller circuitry 202. Thus, the electromagnets 204 may provide a variable magnetic field to increase the constant sealing force, or constant applied seal loading, of the interface 314 of the carbon seal 210 and the runner 212, or the variable magnetic energy of the electromagnets 204 provided by the controller circuitry 202 may be subtractive or cancelling of the constant static pre-load magnetic energy of the permanent magnet present in the runner 212 according to the polarity presented.

In examples described herein, the controller circuitry 202 controls the electromagnets 204 to selective adjust the magnetic field to increase or decrease the sealing force loading of the interface 314 of the carbon seal 210 and the runner 212. The controller circuitry 202 may control a variable flow of current to control an electromagnetic field respectively generated by each of the electromagnets 204. In addition, the controller circuitry 202 may variably apply the electromagnetic field to move at least one of the carbon seal 210 or the runner 212 and correspondingly adjust an applied force loading of the interface 314 of the carbon seal 210 and the sealing surface 312 of the runner 212. The electromagnetic field respectively generated by each of the electromagnets 204 may be controlled by the controller circuitry 202 to apply substantially uniform sealing force loading in the interface of the carbon seal 210 and the runner 212. The term "substantially uniform" describes variability in loading due to operational factors such as temperature changes and variable shaft position. Variable shaft position of the rotating shaft may occur since the shaft may orbit or have eccentricity during operation which makes one portion of the interface have larger loads while another portion of the interface may have lower loads. In addition, where the carbon seal 210 is a face seal configuration, the electromagnets 204 may be radially distributed such that "substantially uniform" loading may also at least partially be according to the stiffness of the runner 212 being attracted to each of the energized electromagnets 204.

Although specific example configurations of the electromagnets 204 with or without various configurations of permanent magnets are described, it should be understood that other configurations are possible and within the scope. Moreover, the various examples described are not mutually exclusive and may be used cooperatively in different example configurations and/or interchangeably unless otherwise noted. Also, the features and functionality illustrated and described with regard to FIG. 3 may be used in conjunction with and/or in replacement of the features and functionality of any other examples discussed, unless otherwise indicated.

Figure 4:
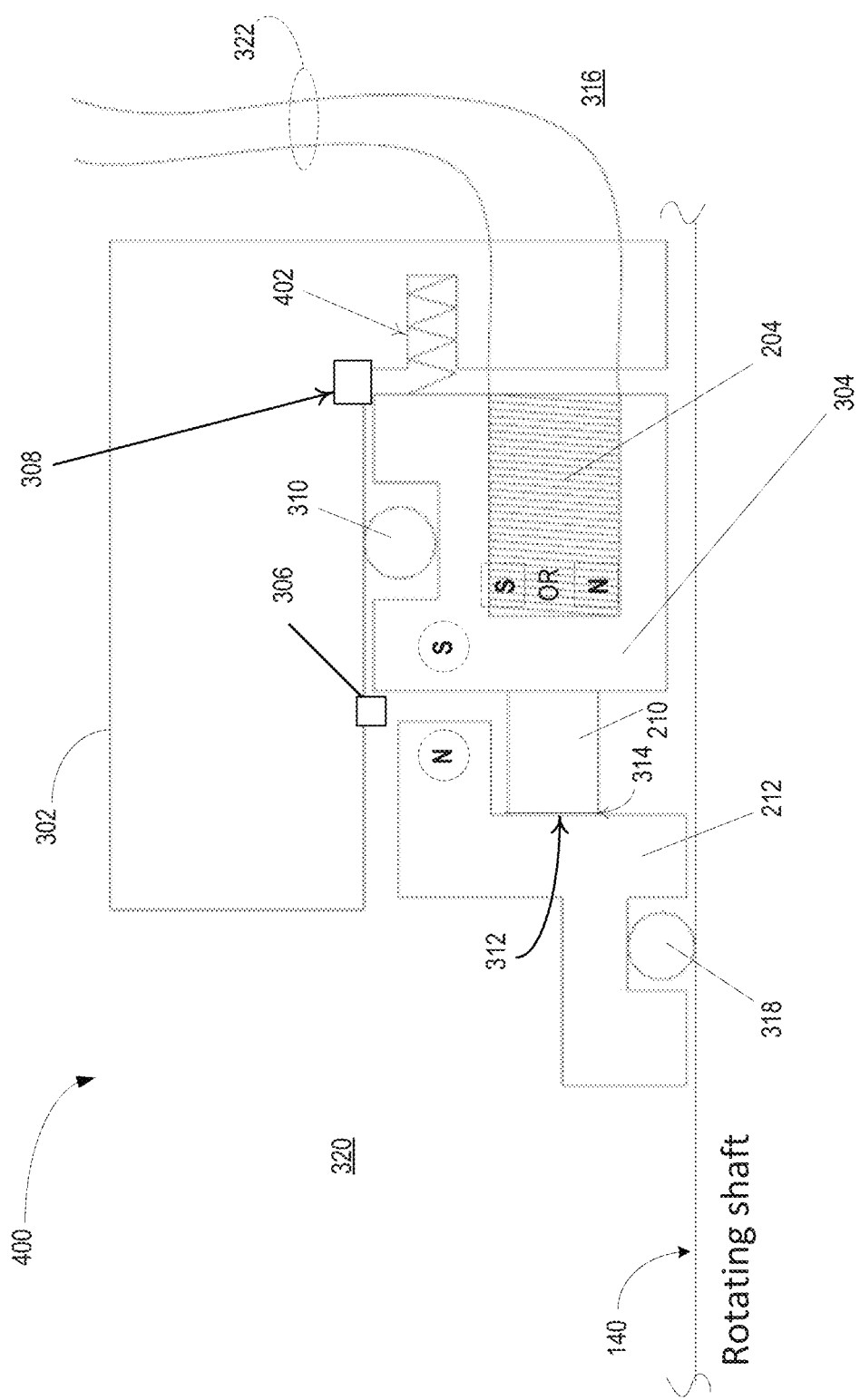
FIG. 4 is another cutaway view of an example electromagnetic carbon seal system and a portion of a rotating mechanical system.

FIG. 4 is another cutaway view of an example electromagnetic carbon seal system 400 and a portion of a rotating mechanical system that includes a shaft 140 and a static housing 302. The example electromagnetic carbon seal system 400 includes electromagnets 204 and a carbon seal 210. The carbon seal 210 of this example is a carbon face seal included in a carriage 304. The system 400 also includes a runner 212 having a sealing surface 312 aligned with the carbon seal 210. In this example, the carriage 304 is illustrated as being held stationary by a shoulder 306 and a retainer ring 308 of the static housing 302, the runner 212 is rotational with a rotating shaft 140 of a rotating mechanical system 202 (FIG. 2), and the carbon seal 210 may be maintained in contiguous contact with the sealing surface 312, or spaced away from the sealing surface 312 by a predetermined gap. In other examples, the runner 212 may be held stationary by the static housing 302, and the carbon seal 210 may rotate with the rotating shaft 140. For purposes of brevity, the discussion of the example illustrated in FIG. 4 will mainly focus on differences with other example systems described herein, and it should be understood that the descriptions and functionality described with respect to other illustrated examples are fully and/or partially applicable to the example of FIG. 4 even if not discussed. Moreover, the features and functionality of the other described examples may be used in conjunction with and/or in replacement of the features and functionality of FIG. 4 unless otherwise noted. Also, the features and functionality illustrated and described with regard to FIG. 4 may be used in conjunction with and/or in replacement of the features and functionality of any other examples discussed, unless otherwise noted.

In FIG. 4, the applied force loading of the interface 314 of the carbon seal and the runner 212 may be by magnetic energy of the electromagnets 204 controlled by the controller circuitry 202, or by a combination of electromagnets 204 and permanent magnets, as discussed elsewhere, along with mechanical springs 402. The mechanical springs 402 may be linear springs, which may apply a linear mechanical force (static pre-load) on the carriage 304. The variable linear mechanical force may cause the carriage 304 to move in an axial direction with respect to the rotating shaft 140 toward the runner 212, and apply substantially constant force static pre-load loading of the carbon seal 210 to the interface 314. The term "substantially uniform" describes variability in loading due to manufacturing tolerance of the mechanical spring, operational factors such as temperature changes and variable shaft position. Thus, the mechanical springs 402 may bias the carriage 304 toward the runner 212, or bias the runner 212 toward the carbon seal 210 to provide a static pre-load sealing force loading of interface 314 of the carbon seal 210 and the runner 212.

The mechanical force supplied by the mechanical spring 402 may be variable according to the position of the carriage 304 with respect to the retainer ring 308. For example, the mechanical spring 402 may be an extension spring, as illustrated, having an equilibrium length in which the mechanical force supplied by the mechanical spring 402 is proportional to changes in the extension or compression spring's length away from the equilibrium length. In other examples, the mechanical spring 402 may be other forms of a biasing agent capable of biasing (static pre-loading) the carriage 304, and therefore the carbon seal 210, toward the interface 314 with the runner 212. For example, the mechanical spring 402 may be a compression spring, a wave spring, a torsion spring, a constant force spring, a Belleville spring, a drawbar spring, a volute spring, and/or a garter spring. Thus, control of the sealing force loading of the interface 314 of the carbon seal 210 and the runner 212 by the controller circuitry 202 includes consideration of the substantially constant force supplied as a static pre-load by the mechanical spring 402.

In an example implementation, the controller circuitry 202 may control the variable magnetic energy of the electromagnets 204 to cause the carriage 304 to move toward the runner 212 to increase the sealing force loading above that provided by the mechanical spring 402. In other example implementations, the variable magnetic energy of the electromagnets 204 may cause the carriage 304 to move toward the static housing 302 to decrease the sealing force loading below that which would otherwise be provided by the mechanical spring 402.

Figure 5:
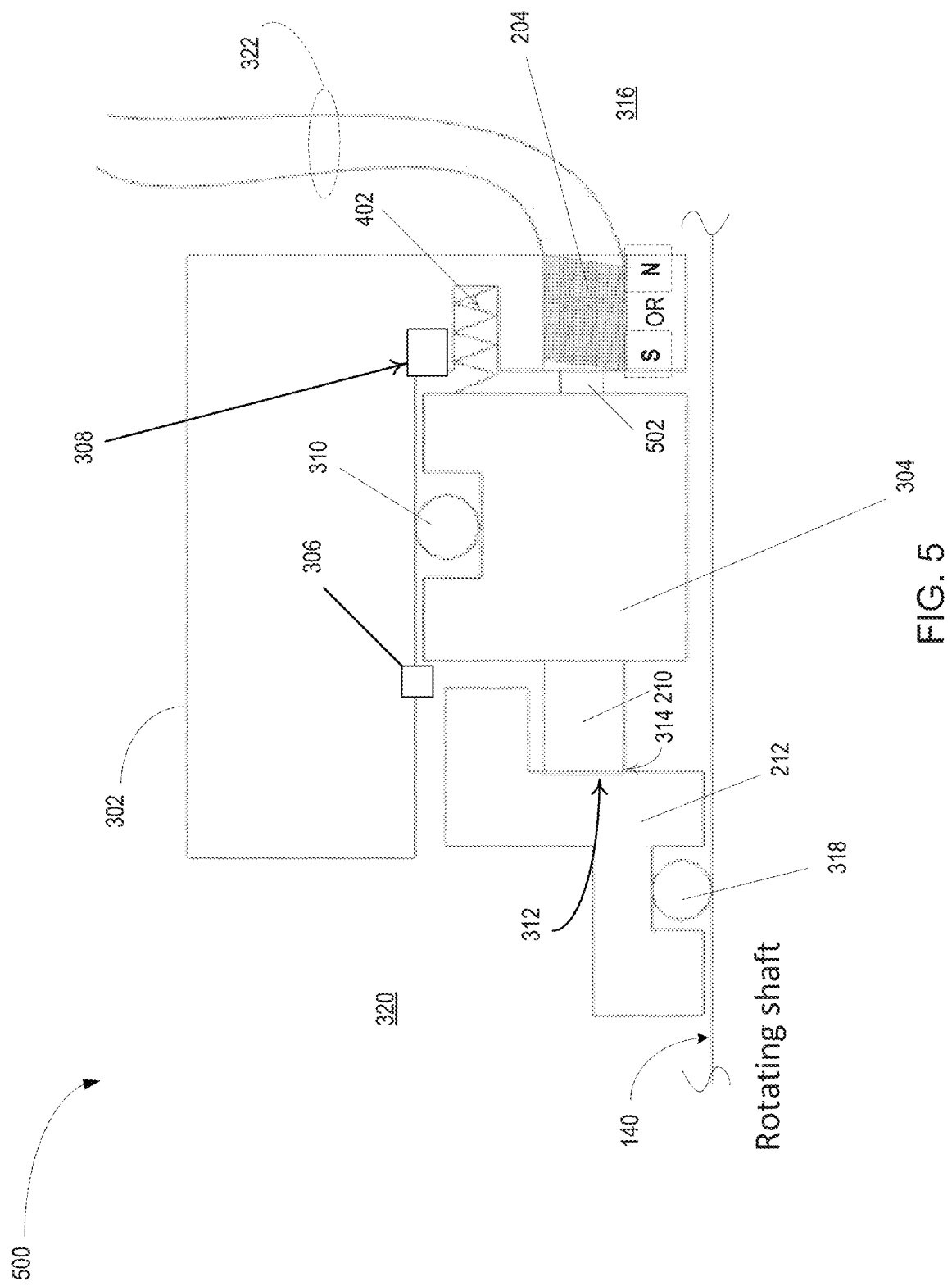
FIG. 5 is yet another cutaway view of an example electromagnetic carbon seal system and a portion of a rotating mechanical system

FIG. 5 is yet another cutaway view of an example electromagnetic carbon seal system 500 and a portion of a rotating mechanical system that includes a shaft 140 and a static housing 302. The example electromagnetic carbon seal system 500 includes electromagnets 204 and a carbon seal 210 included in a carriage 304, and a runner 212 having a sealing surface 312, which may be contiguously aligned with the carbon seal 210, or may be spaced away from the carbon seal 210 by a predetermined distance. In this example, the carbon seal 210 is a carbon face seal, and the carriage 304 is illustrated as being held in position by a shoulder 306 and a retainer ring 308 of the static housing 302, while the runner 212 is rotational with a rotating shaft 140 of a rotating mechanical system 202 (FIG. 2). In other examples, the runner 212 may be held stationary by the static housing 302, and the carbon seal 210 may rotate with the rotating shaft 140. For purposes of brevity, the discussion of the example illustrated in FIG. 5 will mainly focus on differences with other example systems described herein, and it should be understood that the descriptions and functionality described with respect to other illustrated examples are fully and/or partially applicable to the example of FIG. 5 even if not explicitly discussed. Moreover, the features and functionality of the other described examples may be used in conjunction with and/or in replacement of the features and functionality of FIG. 5 unless otherwise noted. Also, the features and functionality illustrated and described with regard to FIG. 5 may be used in conjunction with and/or in replacement of the features and functionality of any other examples discussed, unless otherwise noted.

In the example of FIG. 5, the electromagnets 204 are mounted in the static housing 302, instead of on the carriage 304. In addition, the variable electromagnetic field of the electromagnets 204 being controlled by the controller circuitry 202 is used in conjunction with movable plungers 502 that cooperatively operate with mechanical springs 402 to adjust the position of the carriage 304 and correspondingly, the sealing force loading of the interface 314 of the carbon seal 210 and the runner 212. In other examples, the electromagnets 204 and the plungers 502 may be included in the carriage 304 such that the plunger 502 extends out of the carriage 304 and contacts, couples with, or slides into holes or slots formed in the static housing 302.

The plungers 502 may be axially positioned proximate a wire coil included in the electromagnets 204, and may extend out of the static housing 302. In an example, the plungers 502 may be fixedly coupled with the carriage 304, such as by threaded or welded connection, and the mechanical springs 402 may statically pre-load the interface 314 of the carbon seal 210 and the runner 212 with an applied force via the carriage 304. In this example, the controller circuitry 102 may control the power supply 214 to supply a magnitude of current such that the respective plunger 502 may be attracted to move in a direction toward the static housing 302 and away from the interface 314 with an applied force in an axial direction corresponding to the magnitude of the current being supplied. The applied force may counteract the static pre-loading provided by the mechanical springs 402 on the carriage 304 and reduce the seal pressure loading of the interface 314. Biasing of the carriage with the mechanical springs 402 allows the variable current to move the plungers 502 lesser or further in the direction toward the static housing 302 and away from the interface 314 according to the degree to which the applied forces generated by the electromagnets 204 overcome the linear bias provided by the mechanical springs 402 due to the mechanical springs 402 being further compressed. As the current supplied to the electromagnets 204 is reduced, the linear bias provided by the mechanical spring 402 may move the carriage 304 back toward the interface 314, and thereby increase the seal pressure loading of the interface 314.

In another example, each of the plungers 502 may be fixedly coupled with the carriage 304, such as by threaded or welded connection, and include a permanent magnet. The mechanical springs 402 may bias the carriage 304 with a static pre-load, which is an applied force providing seal pressure loading of the interface 314. In this example, the controller circuitry 102 may control the power supply 214 to supply a magnitude of current having a first polarity such that the respective plunger 502 may be repelled from the respective electromagnet 204 to move in a direction away from the static housing 302 and toward the interface 314 with an applied force in an axial direction corresponding to the magnitude of the current being supplied. The applied force corresponds to an applied force loading of the interface 314 of the carbon seal 210 and the runner 212, resulting in an increase in sealing force loading of the interface 314 above that provided by the mechanical springs 402 alone. Biasing with the mechanical springs 402 allows the variable current to move the plungers 502 lesser or further in the direction away from the static housing 302 and toward the carriage 304 according to the degree to which the applied forces generated by the electromagnets 204 adds to the linear bias provided by the mechanical springs 402 due to being moved further away from an equilibrium position. As the current supplied to the electromagnets 204 is reduced, the linear bias provided by the mechanical spring 402 may move the plungers 502 back toward the static housing 302, and thereby reduce the seal pressure loading of the interface 314 of the carbon seal 210 on the runner 212.

In these examples, the equilibrium position of the mechanical spring 402 may be providing a predetermined amount of applied force (static pre-load), which generates static pre-load sealing force loading of the interface of the carbon seal 210 and the runner 212. In this example, the controller circuitry 102 may control the positioning and applied force of the plunger 502 bi-directionally with the electromagnets 204.

Similar to the example previously discussed with reference to FIG. 5, in this example, additional applied force may be variably supplied by the controller circuitry 202 to move the plunger 502 in a direction away from the static housing 302 and toward the carriage 304 so as to increase the sealing force loading of the interface 314 beyond the static pre-loading being provided by the mechanical spring 402 alone. To reduce the sealing force loading of the carbon seal 210 below that being supplied by the mechanical spring 402 as static pre-loading, the controller circuitry 102 may control the power supply 214 to toggle the polarity of the current to a second polarity opposite the first polarity and supply a magnitude of current to the electromagnets 210 such that the respective plungers 502 may be attracted to the respective electromagnets 204 and move toward the static housing 302, effectively reducing the applied biasing force (static pre-load) that would otherwise be supplied by the mechanical spring 402. As discussed elsewhere, by toggling the polarity of the current, the North and South poles generated by the electromagnets 204 may be reversed. In examples where the plungers 502 include a permanent magnet, the plungers 502 may be controlled by the controller circuitry 102 to selectively provide applied force in both directions, In examples, where there is no permanent magnet present, the runner 212 may remain in a fixed position while the carriage 304 moves to adjust the sealing force loading of the interface between the carbon seal 210 and the runner 212. This may be accomplished with a runner 212 that may be press fit onto the shaft 140. Alternatively, the runner 212 may be in contact with a shoulder or other form of stop on in the shaft 140, and a retention device, such as a nut on a back side of the runner 212, may statically hold the runner in position on the shaft in static contact with the stop. Alternatively, the runner 212 may be direct coupled with the shaft 140, such as being threaded onto the shaft with a thread direction opposite of the rotation direction of the shaft 140.

Figure 6:
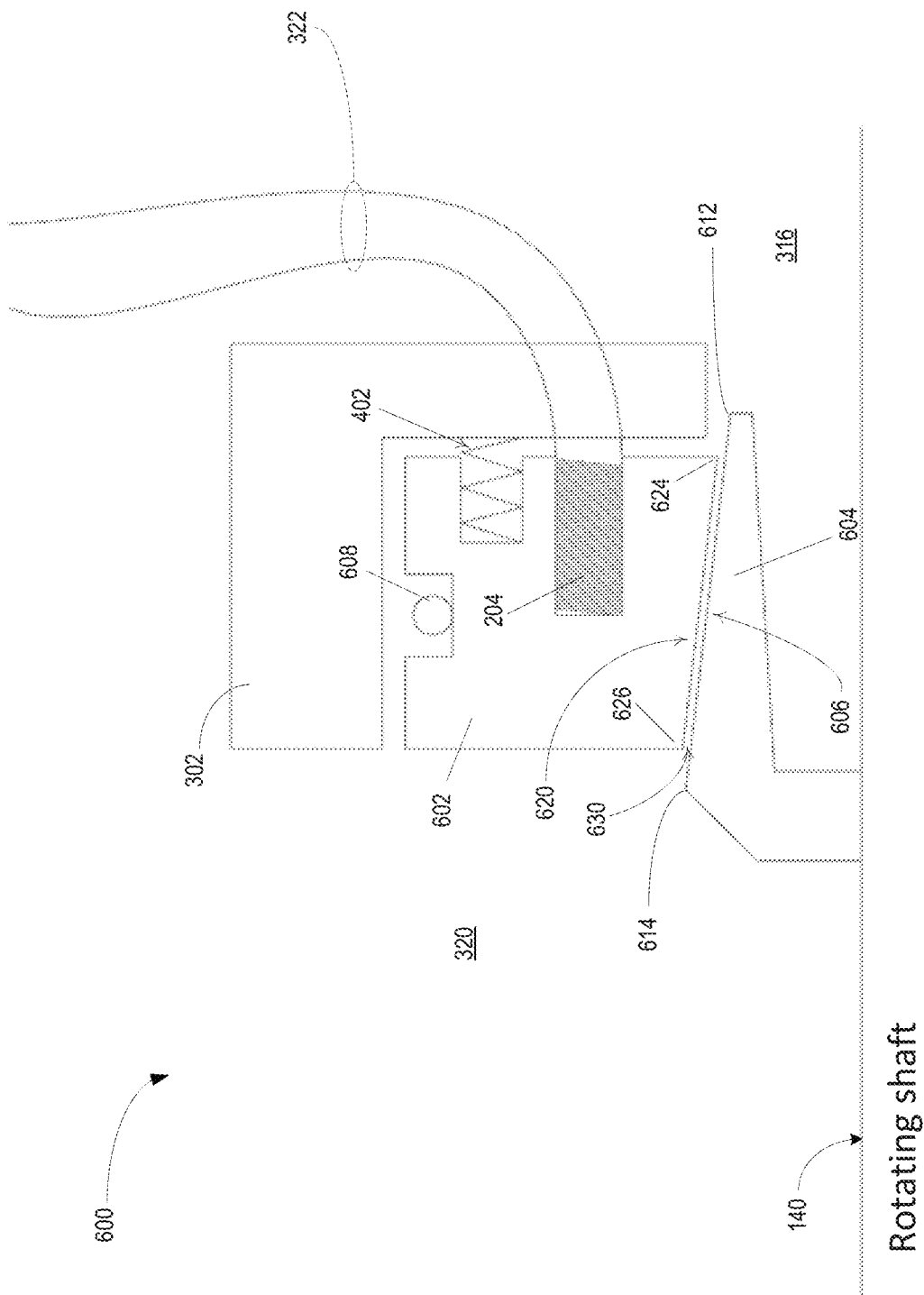
FIG. 6 is another cutaway view of an example electromagnetic carbon seal system and a portion of a rotating mechanical system.

FIG. 6 is another cutaway view of an example electromagnetic carbon seal system 600 and a portion of a rotating mechanical system that includes a rotating shaft 140 and a static housing 302. The example electromagnetic carbon seal system 600 includes electromagnets 204 included in a carbon seal 602, and a runner 604 having a sealing surface 606 aligned with the carbon seal 602. In this example, the carbon seal 602 is a circumferential seal held in the static housing 302, and the runner 604 is rotational with a rotating shaft 140 of a rotating mechanical system 202 (FIG. 2). In other examples, the runner 604 may be held stationary by the static housing 302, and the carbon seal 602 may rotate with the rotating shaft 140. For purposes of brevity, the discussion of the example illustrated in FIG. 6 will mainly focus on differences with other example systems described herein, and it should be understood that the descriptions and functionality described with respect to other illustrated examples are fully and/or partially applicable to the example of FIG. 6 even if not explicitly discussed. Moreover, the features and functionality of the other described examples may be used in conjunction with and/or in replacement of the features and functionality of FIG. 6 unless otherwise noted. Also, the features and functionality illustrated and described with regard to FIG. 6 may be used in conjunction with and/or in replacement of the features and functionality of any other examples discussed, unless otherwise noted.

In the illustrated example of FIG. 6, the carbon seal 602 may be a circumferential seal providing static pre-loading of an interface 630 of the carbon seal 602 and the sealing surface 606. The static pre-loading of the interface 630 may be by a mechanical spring 402 and a circumferential spring 608. The mechanical spring 402 providing an applied mechanical force (static pre-load) in an axial direction with respect to the rotating shaft 140, and the circumferential spring 608 providing an applied mechanical force (static pre-load) in a radial direction with respect to the rotating shaft 140. The circumferential spring 608 may be any form of spring with a resting position, and memory to return to the resting position, such as a garter spring.

The runner 604 may be a tapered runner such that the sealing surface 606 includes a radial dimension that varies in an axial dimension with respect to the rotating shaft 140. As shown in FIG. 6, a first edge 612 at one end of the sealing surface 606 is positioned radially inward of a second edge 614 of the sealing surface 606 positioned opposite the first edge 612. The resulting sealing surface 606 provides an axially ramped linear surface, or inclined plane, which is aligned with a carbon seal surface 620 included on the carbon seal 210. In the illustrated example, the carbon seal surface 620 is a corresponding and oppositely axially ramped linear surface, or inclined plane, having a first edge 624 positioned radially inward from a second edge 626. In other examples the first and second edges 624 and 626 of the carbon seal surface 620 may be orthogonal.

In the example of FIG. 6 the circumferential carbon seal 602, which may or may not be segmented, may have an applied loading at an interface 630 of the carbon seal 602 and the tapered runner 604 at a bore, or peripheral edge of a central aperture, of the carbon seal 602. The bore may be axially aligned, and/or concentrically aligned, with the rotating shaft 140. A set of the mechanical springs 402 and the circumferential spring 608 may cooperatively operate to provide a static pre-load of the carbon seal 602 into the runner 604 thereby applying a static pre-load sealing force loading of the interface 630 of the carbon seal 602 and the sealing surface 606 of the runner 604. The controller circuitry 202 may variably control the electric current supplied to the electromagnets 204 to generate magnetic energy providing an applied force by attraction of the permanent magnets 204 to the static housing 302. The static housing 302 may include a ferromagnetic material, such as steel, or a permanent magnet with properly aligned North-South poles, to which the electromagnets 204 are attracted/repelled when energized. In other examples, the electromagnets 204 may be included in the static housing 302 and the carriage 602 may include a ferromagnetic material, such as steel, or a permanent magnet with properly aligned North-South poles, which are attracted/repelled when the electromagnets 204 are energized.

Due to the magnetic energy generated by the electromagnets 204, the carbon seal 602 may be pulled away from the sealing surface 606 of the runner 604, thereby lessening, or reducing, the static pre-load of the sealing force loading of the interface 630 of the carbon seal 602 and the sealing surface 606 of the runner 604. In the illustrated example, the controller circuitry 202 may control the reduction in sealing force loading of the interface 630 of the carbon seal 602 and the sealing surface 606 to create a gap at the interface 630 between the sealing surface 606 and the carbon seal surface 620. The gap at the interface 630 may be controlled by the controller circuitry 202 to a predetermined width during operation of the rotating mechanical system. Oil from the sump 320 used to, for example, cool the runner 804, may be prevented or limited from entering the gap at the interface 630 at second edge 626 by pressurized air entering the gap at the interface 630 at the first edge 624 from the air side 314.

In alternative examples, the static housing 302 may include a permanent magnet with North/South poles aligned to repel the magnetic energy generated by the electromagnetics 204. In this example, the controller circuitry 202 may control the variable current supplied to electromagnets 204 to be additive to the static pre-load provided by the mechanical spring 402 and the circumferential spring 608 to push the carbon seal 602 away from the static housing 302 and thereby control the gap at the interface 630, and therefore the sealing force loading. In still other examples, an equilibrium position of the mechanical spring 402 and the circumferential spring 608 may establish the gap at the interface 630, and the controller circuitry 202 may toggle the polarity of the current supplied to the electromagnets 204 to be additive or subtractive to the static pre-loading to thereby push or pull the carbon seal 602 to adjust the sealing force loading of the interface 630 of the carbon seal and the sealing surface 606 of the runner 604. The term "substantially uniform" describes variability in loading due to operational factors such as temperature changes and variable shaft position. For a circumferential carbon seal 602 where the electromagnets 204 may be effectively supplementing the circumferential spring 608 the difference in force can be substantial on a percentage basis since the force provided by the circumferential spring 608 is relatively very low.

Figure 7:
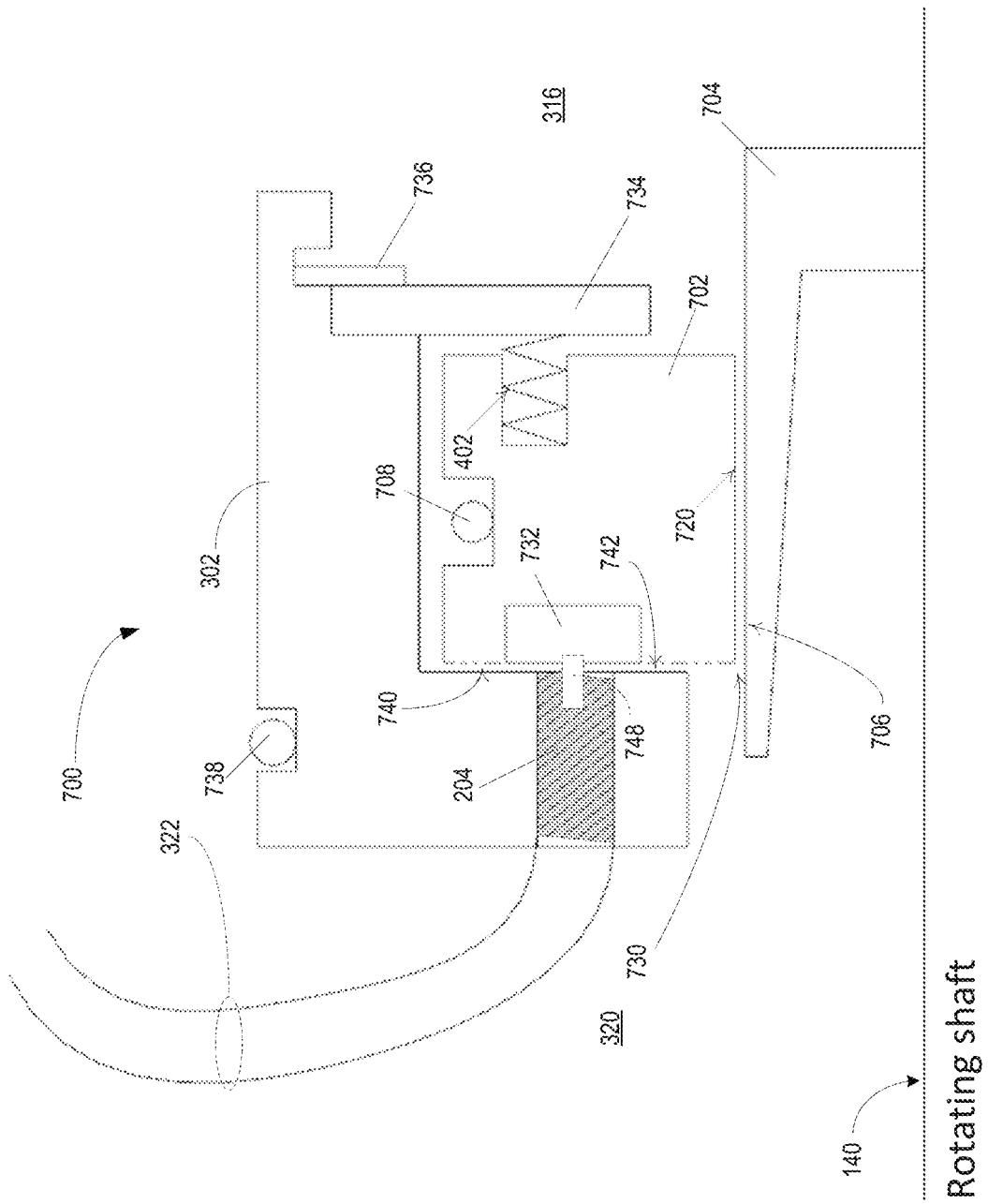
FIG. 7 is another cutaway view of an example electromagnetic carbon seal system and a portion of a rotating mechanical system.

FIG. 7 is another cutaway view of an example electromagnetic carbon seal system 700 and a portion of a rotating mechanical system that includes a rotating shaft 140 and a static housing 302. The example electromagnetic carbon seal system 700 includes electromagnets 204 included in a static housing 302, and a runner 704 having a sealing surface 706 aligned with the carbon seal 702. In this example, the carbon seal 702 is a circumferential seal held in the static housing 302, and the runner 704 is rotational with a rotating shaft 140 of a rotating mechanical system 202 (FIG. 2). In other examples, the runner 704 may be held stationary by the static housing 302, and the carbon seal 702 may rotate with the rotating shaft 140. For purposes of brevity, the discussion of the example illustrated in FIG. 7 will mainly focus on differences with other example systems described herein, and it should be understood that the descriptions and functionality described with respect to other illustrated examples are fully and/or partially applicable to the example of FIG. 7 even if not explicitly discussed. Moreover, the features and functionality of the other described examples may be used in conjunction with and/or in replacement of the features and functionality of FIG. 7 unless otherwise noted. Also, the features and functionality illustrated and described with regard to FIG. 7 may be used in conjunction with and/or in replacement of the features and functionality of any other examples discussed, unless otherwise noted.

In the example of FIG. 7, the carbon seal 702 may be a segmented circumferential carbon seal with embedded permanent magnets 732 disposed in the carbon seal 702 to receive magnetic energy from the electromagnets 204. For example, the carbon seal 702 may be a split ring seal having multiple segments, and a subset of the electromagnets 204 may be included in each of the segments.

Alternatively, ferromagnetic materials, such as a carriage, as discussed elsewhere may be used to hold the carbon seal 702. The electromagnets 204 may be positioned in the static housing 302 adjacent the permanent magnets and/or ferromagnetic material 732. As illustrated in FIG. 7, the sealing surface 706 of the runner 704 may be aligned with a carbon seal surface 720 to provide a gap at an interface 730 of the carbon seal 702 and the sealing surface 706. Alternatively, the sealing surface 706 and the carbon seal surface 720 may be contiguously aligned. The sealing surface 706 of this example may be aligned axially with the rotating shaft 140.

A mechanical spring 402 and a circumferential spring 708 may provide static pre-loading to provide sealing force loading of the interface 730 of the carbon seal 702 and the sealing surface 706 of the runner 704. The mechanical spring 402 may be positioned between a back plate 734 included in the static housing 302 and removeably held in position by a retaining ring 736. The static housing 302 may also include an o-ring 738 to seal against oil escape from the sump 320 around the static housing 302 into the air side 314. The mechanical spring 402 may provide an applied force in the form of a static pre-load axially in parallel to the shaft 140 thereby pressing a seal segment 740 of the carbon seal 702 against a frictional surface wall 742 of the static housing 302. The static pre-load force applied by the circumferential spring 708 radially may overcome the friction between the seal segment 740 and the frictional surface wall 740 to move the carbon seal 702 radially with respect to the sealing surface 706 of the runner 704 and thereby adjust the sealing force loading.

The controller circuitry 202 may control the variable current supplied to the electromagnets 204 to alter the normal load (illustrated by a dash-dot-dot-dash line in FIG. 7) of the seal segment 740 against the frictional surface wall 742 of the static housing 302. Changes in the normal load and hence frictional force allow the static pre-load of the circumferential spring 708 to be either more or less effective at increasing the sealing force loading of the interface 730 of the carbon seal and the sealing surface 706. As the circumferential spring 708 successfully pulls the seal segments of the carbon seal 702 toward the runner 704, the applied force loading of the interface 730 of the carbon seal 702 and the sealing surface 706 of the runner 704 may be altered. In another example, adjustment of the frictional load may be effected by a plunger 748 (shown in dotted lines in FIG. 7) included in each respective electromagnet 204 and the permanent magnet 732 may be omitted. The plunger 748 may be reciprocated axially in one or both directions to push the carbon seal 702 away from the frictional surface wall 742, or allow the seal segment 740 to be pushed toward the frictional surface wall 742 to adjust the applied force loading of the carbon seal on the sealing surface 706. Toggling of the polarity of the electric current and varying the magnitude of the current may be controlled by the controller circuitry 202 to accomplish movement of the plunger 748 axially in opposite directions to varying degree according to a desired normal load, such as setpoint. Measurement of the normal load may be provided by a sensor, such as a pressure sensor.

Figure 8:
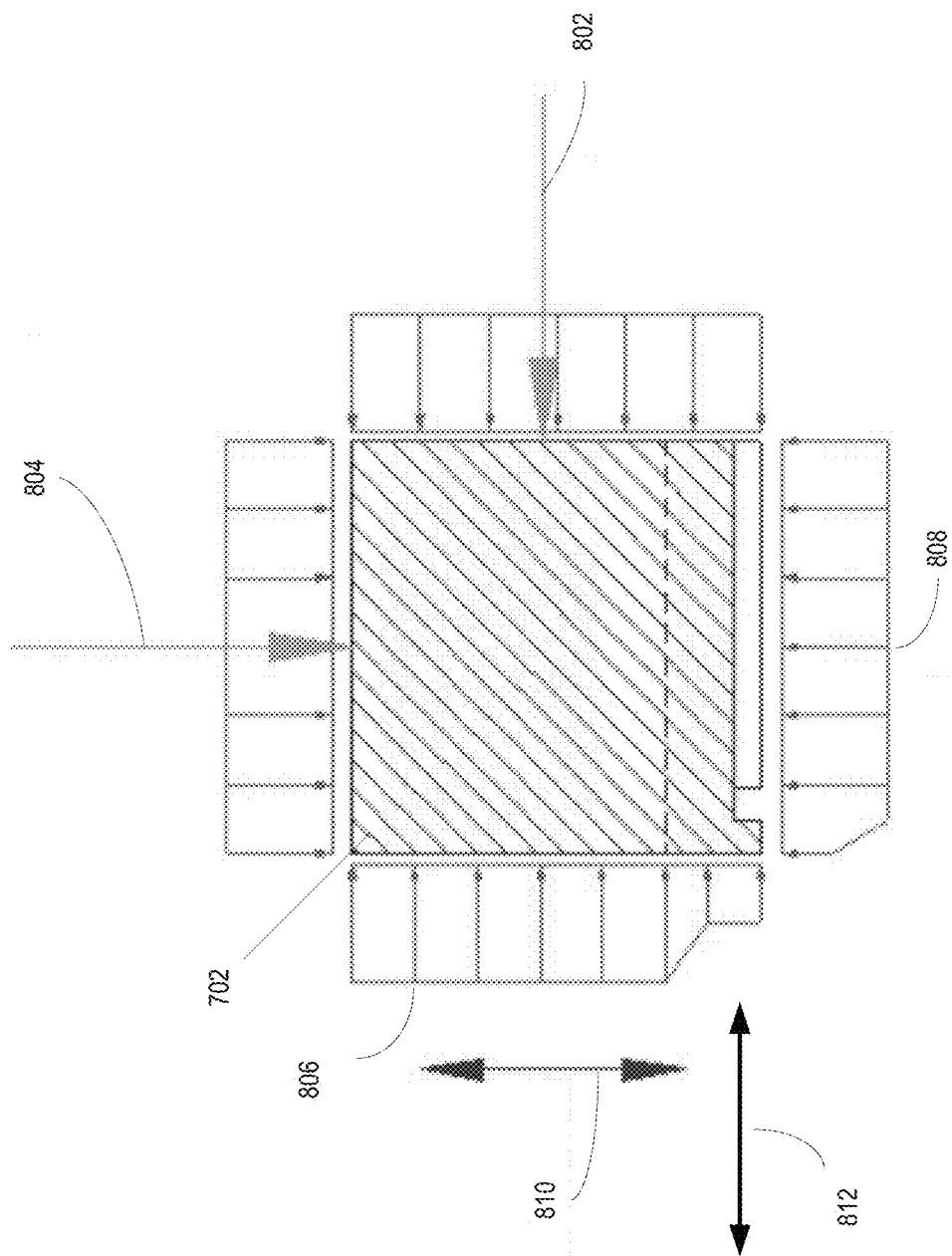
FIG. 8 is a cut-away side view of the carbon seal of FIG. 7 illustrating examples applied forces.

FIG. 8 is a cut-away side view of the carbon seal 702 of FIG. 7 illustrating examples applied forces. In FIG. 8, the carbon seal 702 (or carriage and carbon seal) is subject to a static axial pre-load force 802 axially applied by the mechanical spring 402, and a static radial pre-load force 804 radially applied by the circumferential spring 708. In addition, a static housing normal load 806 is axially applied to the carbon seal 702 responsive to the static axial pre-load force 802. Further, a variable pressure loading force 808 may be applied radially outwardly toward the carbon seal 702 by operation of the mechanical rotating system, such as due to temperature, pressure, rotational speed and the like. A frictional force 810 may be varied by the controller circuitry 202 by varying the electric current supplied to the electromagnets 204. The variable magnetic energy provided by the electromagnets 204 results in a variable electromagnet energy applied force 812, which may be additive, or subtractive, or selectively both additive and subtractive of the static axial pre-load force 802. As a result, the controller circuitry 202 may control the normal load component of the frictional force 810 and correspondingly, the degree of movement of the carbon seal 702 due to the static radial pre-load force 804.

Figure 9:
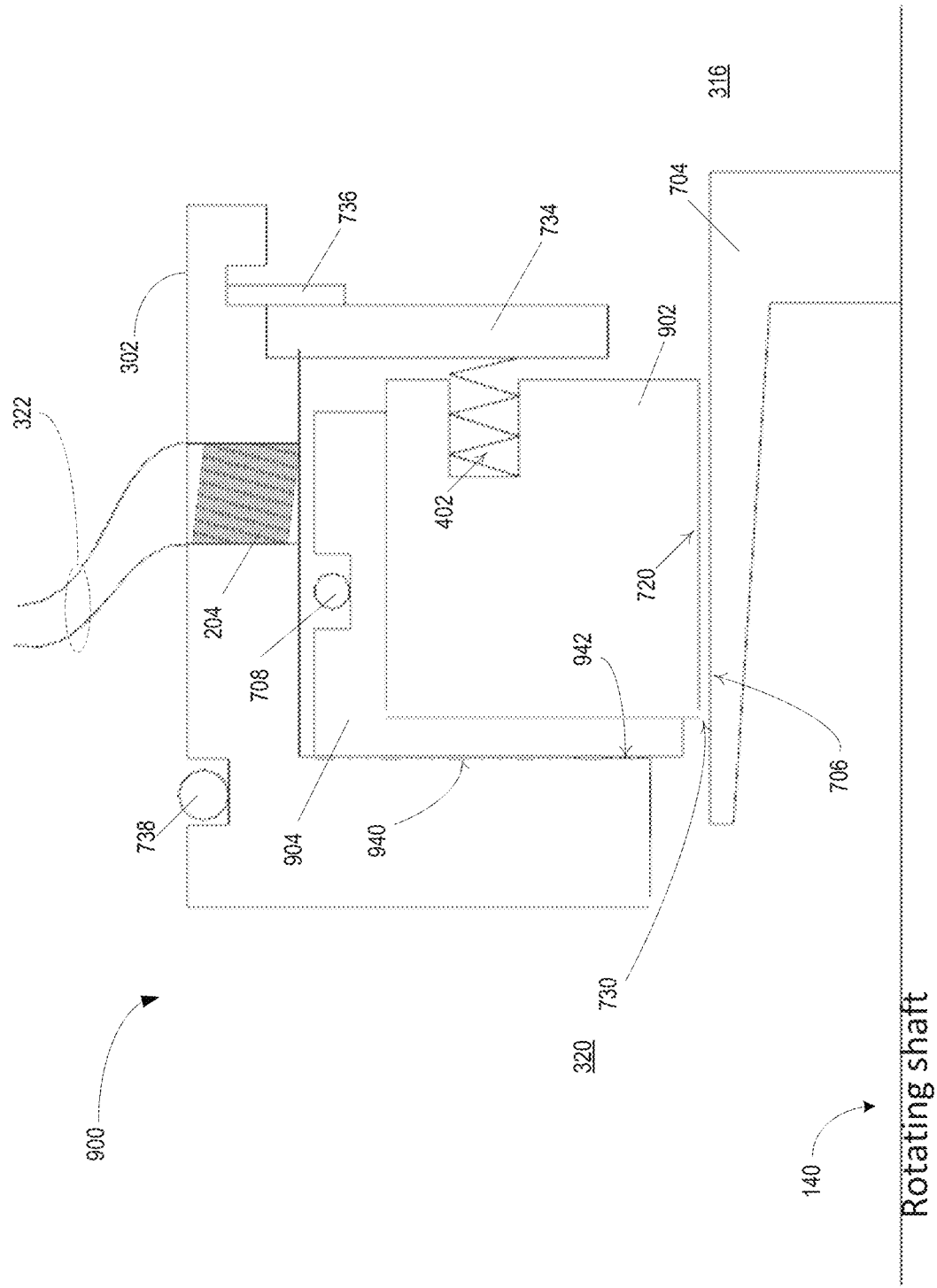
FIG. 9 is another cutaway view of an example electromagnetic carbon seal system and a portion of a rotating mechanical system.

FIG. 9 is another cutaway view of an example electromagnetic carbon seal system 900 and a portion of a rotating mechanical system that includes a rotating shaft 140 and a static housing 302. The example electromagnetic carbon seal system 900 includes electromagnets 204 included in the static housing, a carbon seal 902 and a runner 904 having a sealing surface 906 aligned with the carbon seal 902. In this example, the carbon seal 902 is a circumferential seal held in the static housing 302, and the runner 904 is rotational with a rotating shaft 140 of a rotating mechanical system 202 (FIG. 2). In other examples, the runner 904 may be held stationary by the static housing 302, and the carbon seal 902 may rotate with the rotating shaft 140. For purposes of brevity, the discussion of the example illustrated in FIG. 9 will mainly focus on differences with other example systems described herein, and it should be understood that the descriptions and functionality described with respect to other illustrated examples are fully and/or partially applicable to the example of FIG. 9 even if not explicitly discussed. Moreover, the features and functionality of the other described examples may be used in conjunction with and/or in replacement of the features and functionality of FIG. 9 unless otherwise noted. Also, the features and functionality illustrated and described with regard to FIG. 9 may be used in conjunction with and/or in replacement of the features and functionality of any other examples discussed, unless otherwise noted.

In the example of FIG. 9, the carbon seal 902 may be a segmented circumferential carbon seal positioned in a carriage 904. The carriage 904 may include a ferromagnetic material, and/or may include permanent magnets 732. The electromagnets 204 may be positioned in the static housing 302 adjacent to the carriage 904 and radially outward from the carbon seal 902. The sealing surface 706 of the runner 704 may be aligned with a carbon seal surface 720 to provide a gap at an interface 730 of the carbon seal surface 720 and the sealing surface 706. Alternatively, the sealing surface 706 and the carbon seal surface 720 may be contiguously aligned at the interface 730. The sealing surface 706 of this example may be aligned axially in parallel with the rotating shaft 140.

In this example, the electromagnets 204 may be controlled by the controller circuitry 202 to move the carbon seal 902 radially inward or outward to adjust the sealing force loading of the carbon seal 902 on the sealing face 706 of the runner 704. A mechanical spring 402 and a circumferential spring 708 may cooperatively operate to provide static pre-loading sealing force loading of the interface 730 of the carbon seal 702 and the sealing surface 706 of the runner 704. The mechanical spring 402 may be positioned between a back plate 734 included in the static housing 302 and removeably held in position by a retaining ring 736 to provide static pre-loading that creates a coefficient of friction between a carriage wall 940 of the carriage 904 and a frictional surface wall 942 of the static housing 302 when the mechanical spring 402 presses the carriage 904 into the frictional surface wall 942 of the static housing 302 with an axial static pre-load.

Since the axial static pre-load is substantially constant, the controller circuitry 202 may vary the magnetic energy output by the electromagnets to be additive or subtractive of the radial static pre-load provided by the circumferential spring 708. In examples where the carriage 904 includes ferromagnetic material, as the controller circuitry increases the electric current supplied to the electromagnets 204, the carriage is pulled toward the electromagnets by subtracting or cancelling the sealing force loading provided by the radial static pre-load of the circumferential spring 708. In examples where the carriage 904 includes permanent magnets, the permanent magnets may be attracted or repelled with a varying degree of magnetic energy generated by the electromagnets 204 due to the controller circuitry 202 toggling the polarity and varying the electric current, resulting in incremental adjustment of the sealing force loading by the carbon seal 902 on the sealing face 706 of the runner 704. In still other examples, a plunger may be used with the electromagnets 204 to adjust the radial positioning of the carriage and/or corresponding sealing force loading of the carbon seal 902 on the sealing surface 706 of the runner 704.

Figure 10:
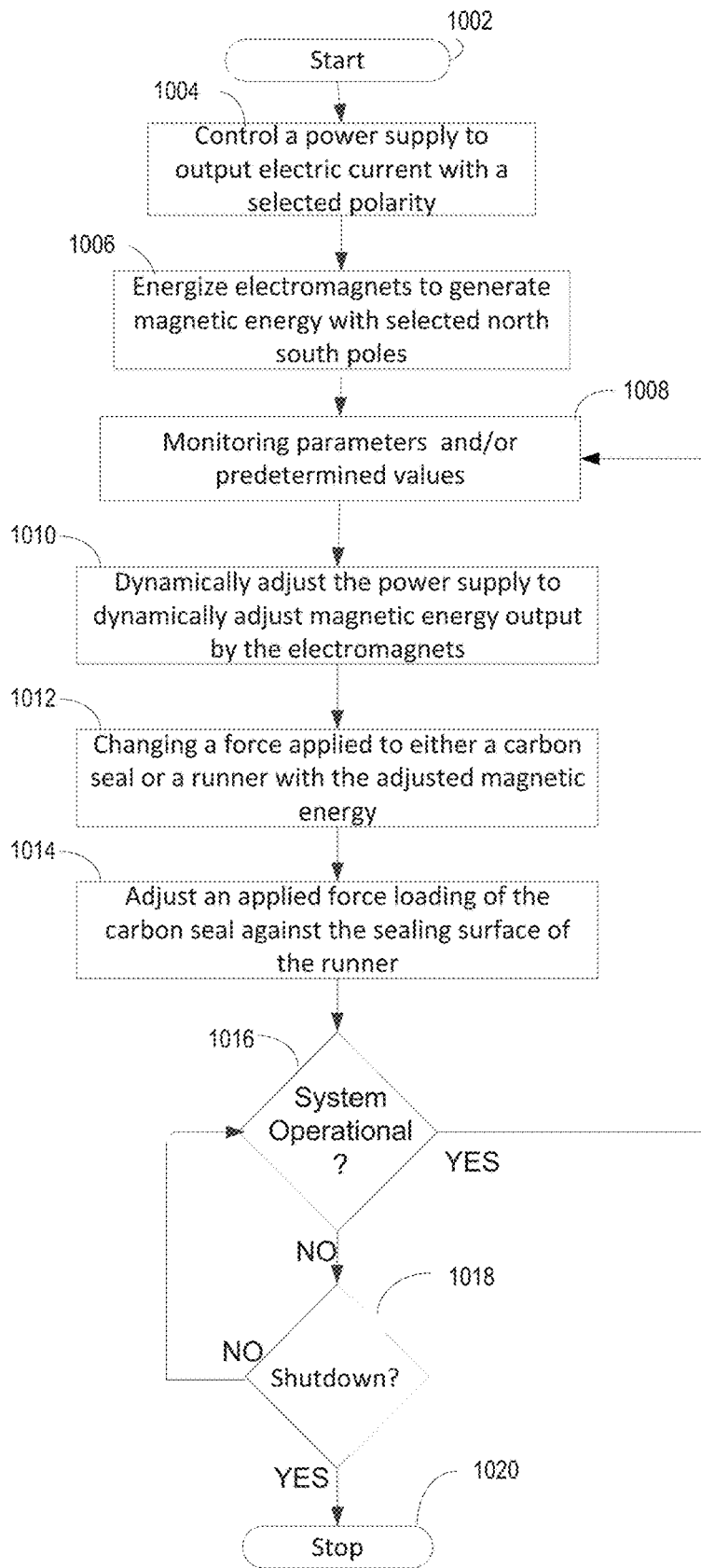
FIG. 10 is an operational flow diagram illustrating an example operation of the electromagnetic carbon seal system.

FIG. 10 is an operational flow diagram illustrating an example operation of the electromagnetic carbon seal system. With reference to FIGS. 1-10, the rotating mechanical device commences operation with varying operational parameters. (1002) The controller circuitry 202 controls the power supply 214 to output a magnitude of electric current with a selected polarity. (1004) Electromagnets 204 are energized by the electric current to generate magnetic energy in a magnetic field with north and south poles established based on the selected polarity. (1006) The controller circuitry 202 monitors operational parameters of the rotating mechanical system with closed loop control and/or predetermined parameters with open loop control. (1008)

The controller circuitry dynamically adjusts the polarity and/or the electric current output by the power supply to adjust the poles and/or the level of magnetic energy being generated in the corresponding magnetic fields of the electromagnets. (1010) Changing a force applied to either a carbon seal or a runner with the adjusted magnetic energy. (1012) Correspondingly adjust an applied force loading of an interface of the carbon seal and a sealing surface of the runner. (1014) Confirm the rotational mechanical system 206 continues operating. (1016) If the rotating mechanical system 206 continues to operate, return to monitoring parameters and/or predetermined values. (1008) If the rotating mechanical system 206 is stopping or has stopped operation, has a shutdown command been received? (1018) If not confirm that the rotating mechanical system 206 is stopping or has stopped operation. (1016) If a shutdown command has been received, stop operation. (1020)

The methods, devices, processing, circuitry, and logic described herein may be implemented in many different ways and in many different combinations of hardware and software. For example, all or parts of the implementations may be controller circuitry 202 that may include an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the controller circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the controller circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Components of the electromagnetic carbon seal system described herein may include additional, different, or fewer components. For example, the controller circuitry may include multiple processors that are distributed within a network included in a vehicle in which the gas turbine engine operates. In another example, multiple carriages runners or static housings may be present in different exemplary systems. In addition, the features and functionality of the electromagnetic carbon seal system described herein may include additional, different, greater or fewer operations than illustrated and/or discussed. In addition, the operations illustrated may be performed in an order different than illustrated.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" or "at least one of <A>, <B>, . . . or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a seal system comprising:
a runner;
a carbon seal aligned with the runner at a sealing surface of the runner, one of the carbon seal or the runner coupled with a rotating member;
a static housing supporting the carbon seal or the runner to maintain alignment of the carbon seal with the sealing surface of the runner, the carbon seal being moveable with respect to the runner and the static housing;
a plurality of electromagnets, each having a respective variable magnetic field; and
a controller circuitry configured to dynamically and selectively control the respective variable magnetic field of the electromagnets to adjust a sealing force loading of an interface of the carbon seal and the sealing surface of the runner.

A second aspect relates to the system of aspect 1, further comprising a carriage positioned in the static housing and holding the carbon seal, wherein the carbon seal is a carbon face seal, the electromagnets are positioned in the carriage, and the runner is a ferromagnetic material or a permanent magnet.

A third aspect relates to the system of aspect 2, wherein the carriage comprises a permanent magnet.

A fourth aspect relates to the system as in any of aspects 1-3, further comprising a plurality of springs biasing the carbon seal toward the runner or biasing the runner toward the carbon seal to provide a static pre-load sealing force loading of the interface of the carbon seal and the sealing surface of the runner.

A fifth aspect relates to the system of aspect 4, wherein the springs comprise at least one of linear springs, wave springs or garter springs, or some combination thereof.

A sixth aspect relates to the system of any preceding aspect, wherein the electromagnets are positioned in the static housing.

A seventh aspect relates to the system of aspect 6, further comprising a plurality of plungers positioned proximate the electromagnets wherein the controller circuitry is configured to dynamically and selectively control the respective variable magnetic field of the electromagnets to attract or repel the plunger to move the carbon seal such that the sealing force loading of the interface of the carbon seal and the runner is adjusted.

An eighth aspect relates to the system of any preceding aspect, wherein the controller circuitry is configured to selective adjust the respective variable magnetic field of the electromagnets to increase or decrease the sealing force loading of the interface of the carbon seal and the sealing surface of the runner.

A ninth aspect relates to the system of any preceding aspect, wherein each of the electromagnets include an electromagnetic coil that generates the respective variable magnetic field of the electromagnets according to a variable current controlled by the controller circuitry, each electromagnetic coil positioned to align the respective variable magnetic field of the electromagnets with the runner or a carriage holding the carbon seal, wherein the runner, the carriage, or both comprise a permanent magnet or a ferromagnetic material that is reactive to the respective variable magnetic field of the electromagnets.

A tenth aspect relates to a seal system comprising:
a static housing;
a carbon seal positioned in the static housing;
a runner having a sealing surface aligned with the carbon seal;
a plurality of electromagnets positioned in the static housing; and
a controller circuitry configured to control a variable flow of current to control an electromagnetic field respectively generated by each of the electromagnets,
the controller circuitry further configured to variably apply the electromagnetic field to move at least one of the carbon seal or the runner and correspondingly adjust an applied force loading of an interface of the carbon seal and the sealing surface of the runner.

An eleventh aspect relates to the system of aspect 10, further comprising a carriage moveably mounted in static housing and including the carbon seal, wherein the carriage is non-magnetic or ferromagnetic and the runner is ferromagnetic.

A twelfth aspect relates to the system of aspect 11, further comprising a permanent magnet positioned in the carriage or the runner to exert an applied force loading as a static pre-load of the interface of the carbon seal and the sealing interface of the runner, the static pre-load being different loading than the applied force loading.

A thirteenth aspect relates to the system as in any of aspects 10-12, wherein the runner includes a permanent magnet generating a constant magnetic energy, and wherein the system further comprises a power supply controlled by the controller circuitry to supply a variable electric current and toggle a polarity of the variable electric current such that the electromagnets generate an additive magnetic energy or a subtractive magnetic energy according to the polarity controlled by the controller circuitry.

A fourteenth aspect relates to the system as in any of aspects 10-13, further comprising a carriage coupled with the carbon seal, the carriage being annularly and axially aligned with a rotating member to which the runner is coupled, and the plurality of electromagnets are in a spaced apart arrangement in the carriage to magnetically attract the carriage to the runner with the electromagnetic field respectively generated by each of the electromagnets.

A fifteenth aspect relates to the system as in any of aspects 10-14, further comprising a mechanical spring positioned to bias the carbon seal toward the interface of the carbon seal and the runner with an applied force provided by the mechanical spring as a static pre-load of the interface.

A sixteenth aspect relates to the system as in any of aspects 10-15, wherein the electromagnetic field respectively generated by each of the electromagnets are controlled by the controller circuitry to apply substantially uniform sealing force loading between the carbon seal and the runner.

A seventeenth aspect relates to the system as in any of aspects 10-16, wherein the carbon seal is a split ring seal having multiple segments, and a subset of the electromagnets are included in each of the segments.

An eighteenth aspect relates to the system as in any of aspects 10-17, wherein the controller circuitry comprises a first controller circuitry and a second controller circuitry that are different and independently executed, the first controller circuitry configured to dynamically and selectively adjust a magnetic field of a first portion of the electromagnets, and the second controller circuitry configured to dynamically and selectively adjust a magnetic field of a second portion of the electromagnets.

A nineteenth aspect relates to the system as in any of aspects 10-18, wherein the second portion of the electromagnets are positioned interspersed with the first portion of the electromagnets.

A twentieth aspect relates to a method of sealing comprising:

placing a carbon seal in alignment with a sealing surface of a runner, one of the carbon seal or the runner coupled to a rotating member and an other of the carbon seal or the runner being held in a static housing;

energizing a plurality of electromagnets with a power supply to create respective magnetic fields for each of the electromagnets;

dynamically adjusting the power supply to dynamically adjust a magnetic energy of the respective magnetic fields; and moving at least one of the carbon seal or the runner and correspondingly adjusting an applied force loading of an interface of the carbon seal and the sealing surface of the runner.

In addition to the features mentioned in each of the independent aspects enumerated above, some examples may show, alone or in combination, the optional features mentioned in the dependent aspects and/or as disclosed in the description above and shown in the figures.

What is claimed is:

1. A seal system comprising:
a runner;
a carbon seal aligned with the runner at a sealing surface of the runner, one of the carbon seal or the runner coupled with a rotating member;
a static housing supporting the carbon seal or the runner to maintain alignment of the carbon seal with the sealing surface of the runner, the carbon seal being moveable with respect to the runner and the static housing;
a plurality of electromagnets, each having a respective variable magnetic field; and
a controller circuitry configured to dynamically and selectively control the respective variable magnetic field of the electromagnets to adjust a sealing force loading of an interface of the carbon seal and the sealing surface of the runner.

2. The system of claim 1, further comprising a carriage positioned in the static housing and holding the carbon seal, wherein the carbon seal is a carbon face seal, the electromagnets are positioned in the carriage, and the runner is a ferromagnetic material or a permanent magnet.

3. The system of claim 2, wherein the carriage comprises a permanent magnet.

4. The system of claim 1, further comprising a plurality of springs biasing the carbon seal toward the runner or biasing the runner toward the carbon seal to provide a static pre-load sealing force loading of the interface of the carbon seal and the sealing surface of the runner.

5. The system of claim 4, wherein the springs comprise at least one of linear springs, wave springs or garter springs, or some combination thereof.

6. The system of claim 1, wherein the electromagnets are positioned in the static housing.

7. The system of claim 6, further comprising a plurality of plungers positioned proximate the electromagnets wherein the controller circuitry is configured to dynamically and selectively control the respective variable magnetic field of the electromagnets to attract or repel the plunger to move the carbon seal such that the sealing force loading of the interface of the carbon seal and the runner is adjusted.

8. The system of claim 1, wherein the controller circuitry is configured to selective adjust the respective variable magnetic field of the electromagnets to increase or decrease the sealing force loading of the interface of the carbon seal and the sealing surface of the runner.

9. The system of claim 1, wherein each of the electromagnets include an electromagnetic coil that generates the respective variable magnetic field of the electromagnets according to a variable current controlled by the controller circuitry, each electromagnetic coil positioned to align the respective variable magnetic field of the electromagnets with the runner or a carriage holding the carbon seal, wherein the runner, the carriage, or both comprise a permanent magnet or a ferromagnetic material that is reactive to the respective variable magnetic field of the electromagnets.

10. A seal system comprising:
a static housing;
a carbon seal positioned in the static housing;
a runner having a sealing surface aligned with the carbon seal;
a plurality of electromagnets positioned in the static housing; and
a controller circuitry configured to control a variable flow of current to control an electromagnetic field respectively generated by each of the electromagnets, the controller circuitry further configured to variably apply the electromagnetic field to move at least one of the carbon seal or the runner and correspondingly adjust an applied force loading of an interface of the carbon seal and the sealing surface of the runner.

11. The system of claim 10, further comprising a carriage moveably mounted in static housing and including the carbon seal, wherein the carriage is non-magnetic or ferromagnetic and the runner is ferromagnetic.

12. The system of claim 11, further comprising a permanent magnet positioned in the carriage or the runner to exert an applied force loading as a static pre-load of the interface of the carbon seal and the sealing interface of the runner, the static pre-load being different loading than the applied force loading.

13. The system of claim 10, wherein the runner includes a permanent magnet generating a constant magnetic energy, and wherein the system further comprises a power supply controlled by the controller circuitry to supply a variable electric current and toggle a polarity of the variable electric current such that the electromagnets generate an additive magnetic energy or a subtractive magnetic energy according to the polarity controlled by the controller circuitry.

14. The system of claim 10, further comprising a carriage coupled with the carbon seal, the carriage being annularly and axially aligned with a rotating member to which the runner is coupled, and the plurality of electromagnets are in a spaced apart arrangement in the carriage to magnetically attract the carriage to the runner with the electromagnetic field respectively generated by each of the electromagnets.

15. The system of claim 10, further comprising a mechanical spring positioned to bias the carbon seal toward the interface of the carbon seal and the runner with an applied force provided by the mechanical spring as a static pre-load of the interface.

16. The system of claim 10, wherein the electromagnetic field respectively generated by each of the electromagnets are controlled by the controller circuitry to apply substantially uniform sealing force loading between the carbon seal and the runner.

17. The system of claim 10, wherein the carbon seal is a split ring seal having multiple segments, and a subset of the electromagnets are included in each of the segments.

18. The system of claim 10, wherein the controller circuitry comprises a first controller circuitry and a second controller circuitry that are different and independently executed, the first controller circuitry configured to dynamically and selectively adjust a magnetic field of a first portion of the electromagnets, and the second controller circuitry configured to dynamically and selectively adjust a magnetic field of a second portion of the electromagnets.

19. The system of claim 18, wherein the second portion of the electromagnets are positioned interspersed with the first portion of the electromagnets.

20. A method of sealing comprising:
placing a carbon seal in alignment with a sealing surface of a runner, one of the carbon seal or the runner coupled to a rotating member and an other of the carbon seal or the runner being held in a static housing;
energizing a plurality of electromagnets with a power supply to create respective magnetic fields for each of the electromagnets;
dynamically adjusting the power supply to dynamically adjust a magnetic energy of the respective magnetic fields; and
moving at least one of the carbon seal or the runner and correspondingly adjusting an applied force loading of an interface of the carbon seal and the sealing surface of the runner.

* * * * *